United States Patent
Gschwind et al.

(10) Patent No.: US 11,556,593 B1
(45) Date of Patent: Jan. 17, 2023

(54) STRING SIMILARITY DETERMINATION

(71) Applicant: International Business Machines Corporation, Armonk, NY (US)

(72) Inventors: Thomas Gschwind, Zurich (CH); Christoph Adrian Miksovic Czasch, Aeugst am Albis (CH); Paolo Scotton, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/375,060

(22) Filed: Jul. 14, 2021

(51) Int. Cl.
  *G06F 16/2457*  (2019.01)
  *G06F 16/903*  (2019.01)

(52) U.S. Cl.
  CPC .. *G06F 16/90344* (2019.01); *G06F 16/24578* (2019.01)

(58) Field of Classification Search
  CPC ..................... G06F 16/90344; G06F 16/24578
  See application file for complete search history.

(56) References Cited

U.S. PATENT DOCUMENTS

| | | | |
|---|---|---|---|
| 10,540,585 B2* | 1/2020 | Norouzi | G06N 3/0454 |
| 2014/0358829 A1 | 12/2014 | Hurwitz | |
| 2015/0066862 A1 | 3/2015 | Anderson | |
| 2017/0004206 A1* | 1/2017 | Boland | G06F 16/9024 |
| 2019/0354596 A1 | 11/2019 | Mirylenka | |
| 2021/0397591 A1* | 12/2021 | Camper | G06F 16/2365 |

FOREIGN PATENT DOCUMENTS

WO  2020227419 A1  11/2020

OTHER PUBLICATIONS

Andreas Uhl and Peter Wild, "Enhancing iris matching using levenshtein distance with alignment constraints," In International Symposium on Visual Computing, vol. 6453, pp. 469-478. Springer, 2010. Lecture Notes in Computer Science, https://link.springer.com/chapter/10.1007/978-3-642-17289-2_45.

(Continued)

*Primary Examiner* — Kannan Shanmugasundaram
(74) *Attorney, Agent, or Firm* — Nathan M. Rau

(57) ABSTRACT

A system and a method for determining a similarity between a first string and a second string. A sequence of edit operations are performed on the first string in order to obtain the second string may be determined. The edit operation is of a first type or a second type. The first type operation comprises a character insertion operation or character removal operation. The second type operation comprises a character maintenance operation. The first type edit operation is associated with an operation score indicative of a cost for applying the edit operation. The first type edit operation is associated with a switching score indicative whether it is immediately followed by a second type edit operation. The switching scores and/or operation scores associated with the sequence of edit operations are combined in order to obtain a combined score that is indicative of the similarity level between the first and second strings.

17 Claims, 10 Drawing Sheets

(56) References Cited

OTHER PUBLICATIONS

Cohen, William & Ravikumar, Pradeep & Fienberg, Stephen, "A Comparison of String Metrics for Matching Names and Records," 2003, Proc of the KDD Workshop on Data Cleaning and Object Consolidation, http://citeseerx.ist.psu.edu/viewdoc/summary?doi=10.1.1.5.9007.

Ivan P. Fellegi and Alan B. Sunter, "A theory for record linkage," Journal of the American Statistical Association, 64 (328): 1183-1210, 1969, https://www.tandfonline.com/doi/abs/10.1080/01621459.1969.10501049.

Lise Getoor and Ashwin Machanavajjhala, "Entity resolution: Theory, practice & open challenges." Proceedings of the VLDB Endowment, 5(12): 2018-2019, 2012, http://citeseerx.ist.psu.edu/viewdoc/summary?doi=10.1.1.294.3967.

Matthew A. Jaro, "Advances in record-linkage methodology as applied to matching the 1985 census of Tampa Florida," Journal of the American Statistical Association, 84(406):414-420, Jun. 1989, https://www.jstor.org/stable/2289924.

Mikhail Bilenko, Raymond Mooney, William Cohen, Pradeep Ravikumar, and Stephen Fienberg, "Adaptive name matching in information integration," IEEE Intelligent Systems, 18(5):16-23, Sep. 2003, https://ieeexplore.ieee.org/document/1234765.

V. I. Levenshtein, "Binary codes capable of correcting deletions, insertions and reversals," Soviet Physics Doklady, 10(8):707-710, Feb. 1966, http://www.mathnet.ru/php/archive.phtml?wshow=paper&jrnid=dan&paperid=31411&option_lang=eng.

William E. Winkler, String Comparator Metrics and Enhanced Decision Rules in the Fellegi-Sunter Model of Record Linkage, In Proceedings of the Section on Survey Research Methods, Jan. 1990, https://eric.ed.gov/?id=ED325505.

Zhan Su, Byung-Ryul Ahn, Ki-Yol Eom, Min-Koo Kang, Jin-Pyung Kim, and Moon-Kyun Kim, Plagiarism detection using the Levenshtein distance and Smith-Waterman algorithm, In 3rd International Conference on Innovative Computing Information and Control (ICICIC'08), pp. 569-569. IEEE, 2008, https://ieeexplore.ieee.org/document/4603758.

\* cited by examiner

Fig. 6B left) main function, right) code of innermost loop in the main function (marked with *)

STRING SIMILARITY DETERMINATION

BACKGROUND

The present disclosure relates to the field of digital computer systems, and more specifically, to a method for determining a similarity between two strings.

Record Linkage requires to link elements of a source dataset to related data items of a target dataset. For that a record matching may be performed between records of the datasets. The record matching involves the computation of similarities between strings. However, there is a continuous need to improve the distance measurements.

SUMMARY

Various embodiments provide a method for determining a similarity between two strings, computer system and computer program product as described by the subject matter of the independent claims. Advantageous embodiments are described in the dependent claims. Embodiments of the present disclosure can be freely combined with each other if they are not mutually exclusive.

In one aspect, the disclosure relates to a method for determining a similarity between a string $s_1$ having $N_1$ characters, where $N_1 \geq 0$ and a string $s_2$ having $N_2$ characters, where $N_2 \geq 0$. The method comprises:

a. providing a distance algorithm being configured for:
  i. receiving a first string and a second string;
  ii. determining a sequence of one or more edit operations to be performed on characters of the first string in order to obtain the second string, the edit operation being of a first type or a second type, the first type edit operation comprising a character insertion operation or character removal operation, the second type edit operation comprising a character maintenance operation; wherein the first type edit operation is associated with an operation score indicative of a cost for applying the edit operation; wherein the first type edit operation is associated with a switching score indicative whether it is immediately followed in the sequence by a second type edit operation;
  iii. combining the switching scores and/or operation scores associated with the sequence of edit operations, resulting in a combined score that is indicative of the similarity level between the first and second strings;
b. inputting first $n_1$ characters of the string $s_1$ as the first string and first $n_2$ characters of the string $s_2$ as the second string to the distance algorithm for obtaining the combined score, wherein $0 \leq n_1 \leq N_1$ and $0 \leq n_2 \leq N_2$;
c. determining of the distance between the string $s_1$ and string $s_2$ using the obtained combined score.

In another aspect, the disclosure relates to a computer program product comprising a computer-readable storage medium having computer-readable program code embodied therewith, the computer-readable program code configured to implement all of the steps of the method according to preceding embodiments.

In another aspect, the disclosure relates to a computer system for determining a similarity between a string $s_1$ having $N_1$ characters, where $N_1 \geq 0$ and a string $s_2$ having $N_2$ characters, where $N_2 \geq 0$. The computer system is configured for:

a. providing a distance algorithm being configured for:
  i. receiving a first string and a second string;
  ii. determining a sequence of one or more edit operations to be performed on characters of the first string in order to obtain the second string, the edit operation being of a first type or a second type, the first type edit operation comprising a character insertion operation or character removal operation, the second type edit operation comprising a character maintenance operation; wherein the first type edit operation is associated with an operation score indicative of a cost for applying the edit operation; wherein the first type edit operation is associated with a switching score indicative whether it is immediately followed in the sequence by a second type edit operation;
  iii. combining the switching scores and/or operation scores associated with the sequence of edit operations, resulting in a combined score that is indicative of the similarity level between the first and second strings;
b. inputting first $n_1$ characters of the string $s_1$ as the first string and first $n_2$ characters of the string $s_2$ as the second string to the distance algorithm for obtaining the combined score, wherein $0 \leq n_1 \leq N_1$ and $0 \leq n_2 \leq N_2$;
c. determining of the distance between the string $s_1$ and string $s_2$ using the obtained combined score.

BRIEF DESCRIPTION OF THE DRAWINGS

In the following embodiments of the disclosure are explained in greater detail, by way of example only, making reference to the drawings in which:

FIG. 5B shows the evolution of the content of a matrix indicative of edit distances in accordance with an example of the present subject matter.

FIG. 6B shows the evolution of the content of a matrix indicative of edit distances in accordance with an example of the present subject matter.

DETAILED DESCRIPTION

Figure 1:
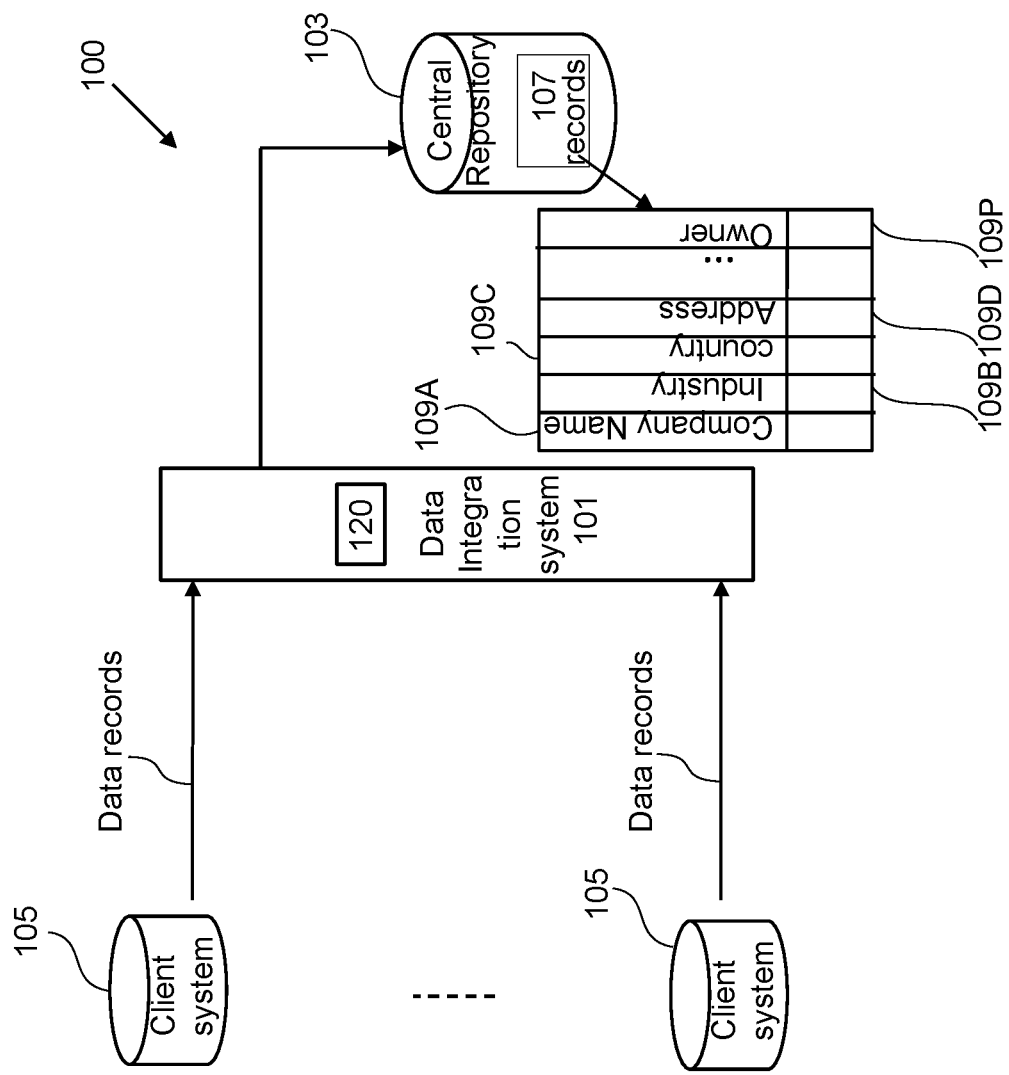
FIG. 1 is a block diagram of a computer system in accordance with an example of the present subject matter.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The similarity between two strings may be measured by a distance between the two strings. However, an accurate determination of the distance that works for a large variety of compared strings may be a challenging task. For that, the present subject matter may provide a string similarity function that provides a number indicating the present algorithm-specific indication of distance. Said number may be the combined score as described herein. The term "string" as used herein may be a sequence of zero or more characters, wherein a character may be a number, a letter or any special character. An accurate determination of the similarity of two strings may have an impact on several fields of applications where the similarity analysis may be used. For example, the present string distance algorithm may be used in areas including fraud detection, fingerprint analysis, plagiarism detection, ontology merging, DNA analysis, RNA analysis, image analysis, evidence-based machine learning, database data deduplication, data mining, incremental search, data integration, Malware Detection, semantic knowledge integration, and natural language processing, where automatic spelling correction can determine candidate corrections for a misspelled word by selecting words from a dictionary that have a low distance to the word in question.

The present subject matter may enable to compute an edit distance by counting the number of edit operations required to transform one string into the other. The edit operations are scored depending on their types. In addition, the present subject matter may score the operations based on their order of application. This may provide accurate comparisons and may overcome the following issues of existing edit distance measures. For example, the Levenshtein similarity between "Textile" and "Textile Company" is the same as between "Textile" and "TCeoxm tpialney" simply because "Company" inserted in junk has the same weight as the letters inserted at random places. The same may occur for "Wachter AG" versus "Wechsler AG" and "Wachter Bau AG". The Levenshtein similarity may penalize word permutations quite heavily. For instance, "Chaussures Michel" and "Michel Chassures" has a farther distance than "Chaussures Michel" and "Chic Chaussures" simply because due to the permutation a lot of insertion and removal operations are necessary.

The present subject matter may provide a distance algorithm. The distance algorithm may receive as input a first string and a second string and determine a sequence of one or more edit operations to be performed on characters of the first string in order to obtain the second string. The distance algorithm may apply a score assignment rule for scoring the sequence of one or more edit operations. The result of the scoring is the combined score. The combined score may be an edit distance between the first string and the second string. The edit operation may be of a first type or a second type. The first type edit operation comprises a character insertion operation (referred to by "I") or character removal operation (referred to by "D"). The second type edit operation comprises a character maintenance operation (referred to by "M"), e.g., the character maintenance operation is named "edit operation" for naming purpose only, as it may not involve editing. The distance algorithm may apply the score assignment rule on each operation of the sequence of operations. The score assignment rule assigns to the first type edit operations an operation score indicative of a cost for applying the first type edit operation. The operation score may, for example, be equal to one. The score assignment rule may assign to the second type edit operation an operation score equal to zero since it may not involve editing. In another example, the operation score assigned to a given edit operation may be weighted by (e.g., multiplied by) a predefined weight associated with the character on which said edit operation is applied. Additionally, and in case the first type edit operation is immediately followed in the sequence by a second type edit operation, the score assignment rule assigns to the first type edit operation a switching score p (or penalty), p=SC, where SC is a value of the penalty. The switching score may, for example, be equal to one or any arbitrary number, preferably less than the sum of the cost for insertion and removal of a character. The switching score may be named a first type switching score in case the first type edit operation is immediately followed in the sequence by a second type edit operation. The fact that the first type edit operation is immediately followed in the sequence by the second type edit operation may be referred to as a first switching type. The first type switching score provides a penalty of changing the type of operations from the first type to the second type. Alternatively, or additionally, the score assignment rule may assign to the first type edit operation the switching score p in case the first type edit operation is immediately preceded in the sequence by a second type edit operation. The switching score may be named, in this case, second type switching score. The fact that the first type edit operation is immediately preceded in the sequence by the second type edit operation may be referred to as a second switching type. The second type switching score may optionally be used. For that, different implementations of the application of the switching scores may be used. In one implementation example, the switching score may be defined as $p=w_{sw} \times SC$, where $w_{sw}$ may be set to a value that enables or disables the switching score. The first type switching score and second type switching score may be associated with weights $w_{sw1}$ and $w_{sw2}$ respectively, wherein the weight of the first type switching score may be set to 1, $w_{sw1}=1$ as the switching score is enabled, while the second type switching score may be set to one if it is considered, or zero if not, e.g., $w_{sw2}=1$ or 0. The first type switching score may be $p=w_{sw1} \times SC$ and the second type switching score may be $p=w_{sw2} \times SC$. Thus, the application of the score assignment rule on the sequence of one or more edit operations may result in switching scores and/or operation scores for the sequence of edit operations. The distance algorithm may combine these switching scores and/or operation scores associated with the sequence of edit operations to obtain a combined score or edit distance that is indicative of the similarity level between the first and second strings. The combination may, for example, be performed by summing the scores. The distance algorithm may be advantageous as it may provide an accurate edit distance between the compared strings. Using the combination of switching and operation scores, the score assignment rule according to the present subject matter may enable an accurate edit distance regardless of how the sequence of edit operations are determined. The sequence of edit operations may be obtained using different techniques. For example, different candidate sequences of edit operations may be determined and the candidate sequence that provides the lowest combined score or lowest edit distance may be selected. For example, the string "shop" may be obtained from "soup" by four deletion operations for deleting characters "s", "o", "u", "p"; and four insertion operations for inserting "s", "h", "o", "p", resulting in a sequence of 8 operations DDDDIIII which would give a distance of 8 since with 8 edit operations the two can be converted and the operation score is 1. However, the minimal set of operations that can do this transformation may have a smaller distance e.g., "shop" may be obtained from "soup" by maintaining "s", inserting "h", maintaining "o", removing "u" and maintaining "p" which is a sequence of 5 operations MIMDM having a lower distance of 6 e.g., four switching scores and two operations scores, where the switching score is 1 and the operation score is 1. In another example, the sequence of edit operations may be obtained using a known technique such as the Levenshtein edit distance technique.

In the following, the initial two strings to be compared may be referred to as string $s_1$ having $N_1$ characters, where $N_1 \geq 0$ and string $s_2$ having $N_2$ characters, where $N_2 \geq 0$. The distance algorithm may be configured to compute the combined score (distance) for two input strings of the algorithm which are referred to as first string and second string, wherein the first string has $n_1$ characters and the second string has $n_2$ characters. Depending on the way the distance algorithm is executed, $n_1$ and $n_2$ may or may not be equal to $N_1$ and $N_2$ respectively, $0 \leq n_1 \leq N_1$ and $0 \leq n_2 \leq N_2$. The combined score determined for $n_1=0$ and $n_2>0$ may indicate the cost for converting an empty character to the $n_2$ characters which may correspond to $n_2$ insertion operations. The combined score determined for $n_1>0$ and $n_2=0$ may indicate the cost for converting the $n_1$ characters into an empty character which may correspond to $n_1$ removal operations.

In one first implementation example, the distance algorithm may be configured to compute at once the similarity between the first string and the second string without relying on previously computed scores e.g., it may compute the combined score of the two strings independent of any other previously computed scores. In this case, for determining the similarity between the strings $s_1$ and $s_2$, the distance algorithm may be called one time with one input pair (first string, second string). For example, the two strings $s_1$ and $s_2$ may be compared (at once) by the distance algorithm by inputting the two strings $s_1$ and $s_2$ to the distance algorithm (i.e., the first string is $s_1$ and the second string is $s_2$) for obtaining the combined score.

According to one embodiment, in case $n_1=N_1$ and $n_2=N_2$ the obtained combined score is indicative of the distance between the string $s_1$ and string $s_2$. The obtained combined score may be the edit distance between the string $s_1$ and string $s_2$. For example, if the string $s_1$ comprises a sequence of characters "sp" and the second string $s_2$ comprises the sequence of characters "shop", the sequence of edit operations to be performed on the characters "sp" in order obtain the sequence of characters "shop" are, maintenance operation (because "s" is maintained), two consecutive insertion operations to insert the characters "ho" and one maintenance operation to maintain "p". The sequence of operations in this case may be MIIM. It is to be noted that other sequences of operations (I, M and D) may be determined using other techniques. The distance algorithm may apply the score assignment rule on the sequence MIIM. The first maintenance operation may receive an operation score OS1=0 since it is an operation of the second type. The second operation "I" may receive an operation score OS2=1 because it is of the first type. The second operation "I" may further receive the second type switching score $w_{sw2} \times SC$ because there was a switching from the first operation which is of second type "M" to the second operation of first type "I". The third operation "I" may receive an operation score OS3=1 because it is of the first type. Moreover, the third operation may receive the first type switching score $w_{sw1} \times SC$ because the operation that immediately follows "I" is "M", an operation of the second type. The last operation may receive an operation score OS4=0 since it is an operation of the second type. The combined score may, for example, be obtained by summing the scores or using other combination techniques e.g., the combined score may be equal to the sum: $w_{sw2} \times SC + OS1 + OS2 + OS3 + w_{sw1} \times SC + OS4$, where $w_{sw1}=1$ and $w_{sw2}=1$.

According to one embodiment, the method further comprises providing a character weight to each character of the string $s_1$ and the string $s_2$, wherein the association of the operation score to the first type edit operation comprises weighting the operation score with the character weight of the character involved in the first type edit operation, wherein the association of the first type switching score to the first type edit operation comprises weighting the switching score p with a weight $w_c$, the weight $w_c$ being a function of the combined score of a subsequence of operations having as a last operation said first type edit operation and the number of first type edit operations in said subsequence. For example, the function may be the ratio of the combined score and the number of first type edit operations, but it is not limited to as other functions may be used. In this embodiment, the second type switching score may not be applied. Following the above example of $s_1$="sp" and $s_2$="shop", the combined score may be equal to: $w_{sw2} \times SC + w1 \times OS1 + w2 \times OS2 + w3 \times OS3 + w_c \times w_{sw1} \times SC + w4 \times OS4$, wherein the weights w1 to w4 are the weights associated with the 4 characters of the string $s_2$ respectively, $w_c$ is the combined score assigned to the subsequence of operations including and preceding the edit operation that has been assigned the switching score $w_{sw1} \times SC$ divided by the number of operations in said subsequence, $w_{sw1}=1$ and $w_{sw2}=0$. $w_c$ may be referred to as average character weight. Indeed, since the penalty may depend on the weight of the characters to be inserted (or removed), a penalty may not be assigned upfront i.e., $w_{sw2}=0$, when there is a deviation from diagonal processing (identical string) to non-diagonal progression. Instead, the penalty may be assigned i.e., $w_{sw1}=1$ when returning from a non-diagonal progression to a diagonal progression. The diagonal and non-diagonal progressions refer to the iterative implementation using a matrix. The deviation from the diagonal to non-diagonal progressions refers to the second switching type and the deviation from the non-diagonal to diagonal progressions refers to the first switching type.

According to one embodiment, the distance algorithm is further configured for: associating to each first type edit operation of the sequence of edit operations the switching score if it is immediately preceded in the sequence by a second type edit operation. Following the above example of $s_1$="sp" and $s_2$="shop", the second operation "I" may further be assigned a switching score $w_{sw2} \times SC$ according to this embodiment because it is immediately preceded by the first operation which is of the second type. In this case, the combined score may be $w_{sw2} \times SC + OS1 + OS2 + OS3 + w_{sw1} \times SC + OS4$, where $w_{sw1}=1$ and $w_{sw2}=1$. This switching score $w_{sw2} \times SC$ may advantageously be used for scores computed without character weights.

According to one embodiment, $N_1 \geq 1$ and/or $N_2 \geq 1$. The similarity level between string $s_1$ and $s_2$ may be modeled by the following function:

$$s_{gl} = 1.0 - \frac{d_{gl}(s_1, s_2)}{|s_1| + |s_2| + p\overline{w} \min(2|s_1|, |s_2| - 1)},$$

where $\overline{w}$ is an average character weight of the strings $s_1$ and $s_2$, where $d_{gl}(s_1,s_2)$ is the combined score obtained by the present method, and p is switching score.

Figure 5A:
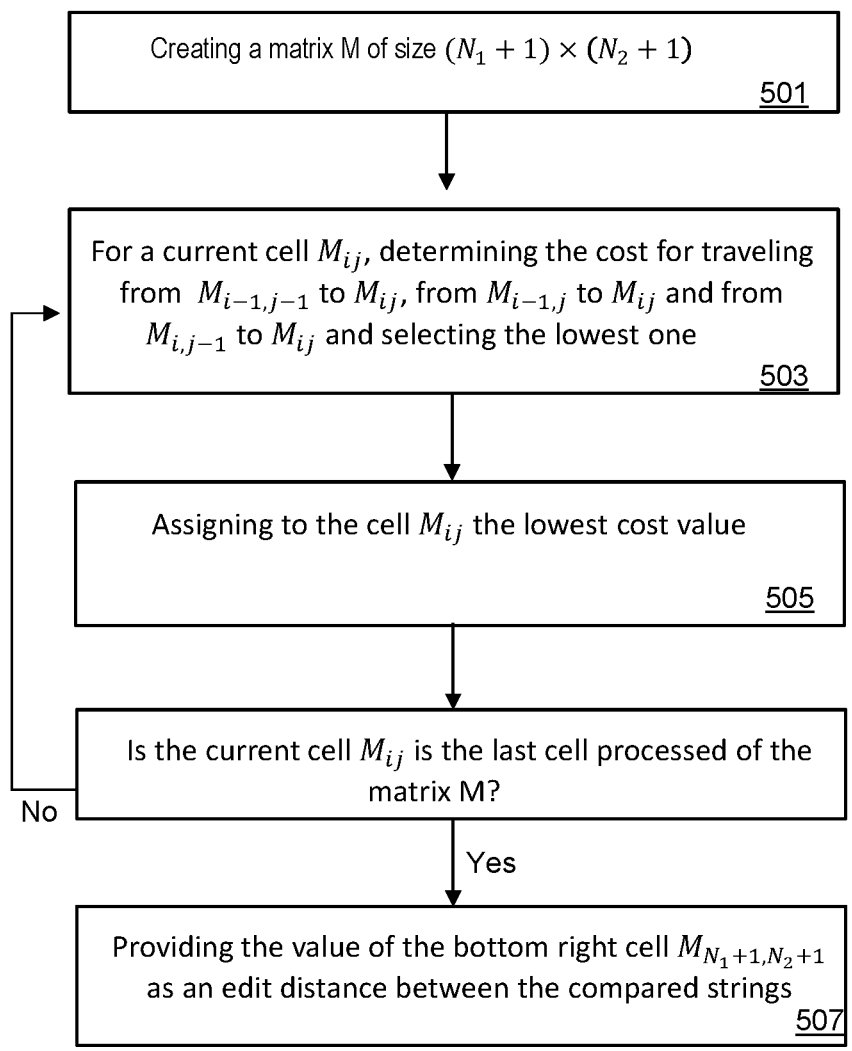
FIG. 5A is a flowchart of a method for determining a similarity between two strings in accordance with an example of the present subject matter.

In one second implementation example that may reuse previous computations, the distance algorithm may use previously computed combined scores if it is iteratively called for processing of the characters of the strings $s_1$ and $s_2$. In this case, for determining the distance between the strings $s_1$ and $s_2$, the distance algorithm may be called multiple times, wherein the result of the last iteration may be the combined score that indicates the distance/similarity between the initial strings $s_1$ and $s_2$. In this example, the distance algorithm may determine the sequence of operations for a current pair of the first string and the second string based on sequences that have been previously computed in previous iterations. This may save resources that would otherwise be required for unnecessary repeated determination of operations. In this case, the distance algorithm was first called with the first string having $n_1=0$ characters of the string $s_1$ and the second string having $n_2=0$ characters of the string $s_2$, which correspond to two empty characters. The distance algorithm may determine that the empty characters have a distance of zero. Using values of $n_1$ and $n_2$ that start from zero may be advantageous as it may enable to set initial values of the combined scores for pairs (first string, second string) having values $n_1=0$ or $n_2=0$. Thus, according to one embodiment, the method further comprises providing or determining or setting initial values of the combined scores for pairs of first and second strings having respectively $n_1$ and $n_2$ characters, wherein $n_1=0$ and $n_2=0, 1, \ldots N_2$; or $n_2=0$ and $n_1=0, 1, \ldots N_1$. This is shown in FIG. 5A-B where the initial values may be provided for the first row and first column of the matrix.

Hence, according to one embodiment of the second implementation example, the first $n_1$ characters of the string $s_1$ and first $n_2$ characters of the string $s_2$ may repeatedly be input to the distance algorithm, wherein new values of $n_1$ and $n_2$ are chosen in each iteration according to a nested loop until $n_1=N_1$ and $n_2=N_2$ characters respectively, wherein $n_1$ represents the outer loop and $n_2$ represents the inner loop. That is, for a given iteration, $n_1$ may be fixed to a value between 0 and $N_1$ and $n_2$ may be incremented from 0 to $N_2$, then $n_1$ may be fixed to a next value between 0 and $N_1$ and so on. This may enable to implement this second implementation example in a matrix as described in FIGS. 5A-B. In each iteration, the distance algorithm may determine/check whether:

- a first combined score has been previously determined (e.g., or was set/initialized) for the first string having $n_1-1$ (and $n_1-1 \geq 0$) characters and the second string having $n_2$ characters using a first sequence of the edit operations, and/or
- a second combined score was previously determined (e.g., or was set/initialized) for the first string having $n_1$ characters and the second string having $n_2-1$ (and $n_2-1 \geq 0$) characters using a second sequence of the edit operations, and/or
- a third combined score was previously determined (e.g., or was set/initialized) for the first string having $n_1-1$ (and $n_1-1 \geq 0$) characters and the second string having $n_2-1$ (and $n_2-1 \geq 0$) characters using a third sequence of the edit operations, and the last character of the first string and the second string being the same.

If all the checked combined scores have been previously computed and/or set, the distance algorithm may then select the lowest score of the computed/set combined scores. That is, the selected lowest score may be the first or second or third combined score. The selected lowest score may be the combined score determined for a selected sequence of edit operations, wherein the selected sequence of edit operations is the first, second or third sequence of edit operations whose combined score was selected as the lowest score. The distance algorithm may determine an additional operation to be performed in addition to the selected sequence of edit operations in order to obtain the second string of the current iteration from the first string of the current iteration. Therefore, the sequence of edit operations for converting the first string to the second string of the present iteration comprises the selected sequence of edit operations plus the determined additional operation. The distance algorithm may apply the score assignment rule taking into account the additional operation. This may result in an operation score and to a switching score if the operation preceding the additional operation in the sequence is of a different type. The selected lowest score may be combined with the resulting operation score and switching score induced by the additional operation. This combined score is the edit distance between the first string and the second string of the present iteration.

If at least one of the checked combined scores has not been previously computed or set, the distance algorithm may compute that at least one combined score before selecting the lowest score and determining the sequence of operations and the edit distance as described above. However, this may only occur for pairs of first string second string having $n_1=0$ or $n_2=0$ (e.g., $n_1=0$ and $n_2=0$ represent the empty characters) and no corresponding initial or set values are provided beforehand.

According to one embodiment, the method further comprises saving the combined scores computed for each pair of the first string having $n_1=N_1$ characters and second string having $n_2$ characters varying from 0 to $N_2$, and the combined scores computed for each pair of first string having $n_1$ characters varying from 0 to $N_1$ and second string having $n_2=N_2$ characters. The method further comprises receiving a request to compare two strings $s_3$ and $s_4$, wherein $s_3=s_1+m_1$ and $s_4=s_2+m_2$, wherein $m_1$ and $m_2$ are strings of zero or more characters. The second example implementation of the method may be applied on $s_3$ and $s_4$ using the saved scores, by repeatedly inputting the first $n_1$ characters of the string $s_3$ and first $n_2$ characters of the string $s_4$ to the distance algorithm by changing in each iteration $n_1$ and $n_2$ to new values (as described above), wherein the values of $n_1$ iterate over the range $0 \ldots N_1$ while the values of $n_2$ iterate over the range $N_2+1 \ldots N_4$ (right quadrant of the matrix) and subsequently the values of $n_1$ iterate over the range $N_1+1 \ldots N_3$ while the values of $n_2$ iterate over the range $0 \ldots N_4$ (lower two quadrants of the matrix).

According to one embodiment, the determining of the sequence of operations and the association of the operation scores and the switching scores are performed character wise in parallel.

According to one embodiment, the distance algorithm may be used to perform record matching between two records. The record matching comprises comparing pairs of attributes values of the two records using the distance algorithm resulting in individual similarity levels of the attributes and combining the individual similarity levels for determining whether the two records are matching records.

The distance algorithm may be executed in accordance with any of the previously described example implementations.

A data record or record is a collection of related data items such as a name, date of birth and class of a particular user. A record represents an entity, wherein an entity refers to a set of user, object, or concept about which information is stored in the record. The terms "data record" and "record" are interchangeably used. The data records may, for example, be stored in a graph database as entities with relationships, where each record may be assigned to a node or vertex of the graph with properties being attribute values such as name, date of birth etc. The data records may, in another example, be records of a relational database.

Matching of records comprises comparing attribute values of the records. For example, if the records comprise a set of attributes a1 to an, the comparison between two records is performed by comparing the n pairs of values of the attributes a1 to an respectively. The comparison between two or more records may thus result in n individual similarity levels indicative of the level of similarity of the values of the respective attributes a1 to an. A level of similarity (or level of matching) between the compared records may be a combination (e.g., average) of the individual levels of similarities. The level of matching of two records indicates the degree of similarity of the attribute values of the two records. Each similarity of the level of similarity, the individual level of similarities and the word level similarities may be provided as a normalized value (e.g., between 0 and 1) or any other format that enables to match the records. If the level of matching is higher than a predefined similarity threshold, this indicates that the two records are matching. A deduplication system built on this disclosure may then merge the records because they represent the same entity. The merging of records is an operation which can be implemented in different ways. For example, the merging of two records may comprise creating a golden record as a replacement of the similar looking records which have been found to be duplicates to each other. This is known as data fusion or physical collapse with either record or attribute level survivorship. If the level of matching is smaller than or equal to the predefined similarity threshold, this indicates that the two records are not matching and may thus be kept separate data records.

According to one embodiment, $N_1 \geq 1$ and/or $N_2 \geq 1$. The similarity level between string $s_1$ and string $s_2$ may be modeled by the following function:

$$s_{gl} = 1.0 - \frac{d_{gl}(s_1, s_2)}{|s_1| + |s_2| + p\ \min(2|s_1|, |s_2| - 1)},$$

where p is the switching score and $d_{gl}(s_1,s_2)$ is the combined score.

FIG. 1 depicts an exemplary computer system 100. The computer system 100 may, for example, be configured to perform master data management and/or data warehousing e.g., the computer system 100 may enable a de-duplication system. The computer system 100 comprises a data integration system 101 and one or more client systems or data sources 105. The client system 105 may comprise a computer system (e.g., as described with reference to FIG. 8). The client systems 105 may communicate with the data integration system 101 via a network connection which comprises, for example, a wireless local area network (WLAN) connection, WAN (Wide Area Network) connection, LAN (Local Area Network) connection the internet or a combination thereof. The data integration system 101 may control access (read and write accesses etc.) to a central repository 103.

Data records stored in the central repository 103 may have values of a set of attributes 109A-P such as a company name attribute. Although the present example is described in terms of few attributes, more or less attributes may be used. The dataset 107 that is used in accordance with the present subject matter may comprise at least part of the records of the central repository 103.

Data records stored in the central repository 103 may be received from the client systems 105 and processed by the data integration system 101 before being stored in the central repository 103. The received records may or may not have the same set of attributes 109A-P. For example, a data record received from client system 105 by the data integration system 101 may not have all values of the set of attributes 109A-P e.g. the data record may have values of a subset of attributes of the set of attributes 109A-P and may not have values for the remaining attributes. In other terms, the records provided by the client systems 105 may have different completeness. The completeness is the ratio of number of attributes of a data record comprising data values to a total number of attributes in the set of attributes 109A-P. In addition, the received records from the client systems 105 may have a structure different from the structure of the stored records of the central repository 103. For example, a client system 105 may be configured to provide records in XML format, JSON format or other formats that enable to associate attributes and corresponding attribute values.

In another example, data integration system 101 may import data records of the central repository 103 from a client system 105 using one or more Extract-Transform-Load (ETL) batch processes or via HyperText Transport Protocol ("HTTP") communication or via other types of data exchange.

The data integration system 101 may, for example, be configured to process the received records e.g., to identify duplicate records. For that, a distance algorithm 120 implementing at least part of the present method may be used. For example, the data integration system 101 may process a data record received from the client systems 105 using the distance algorithm 120 in order to find matching records in the dataset 107.

Figure 2:
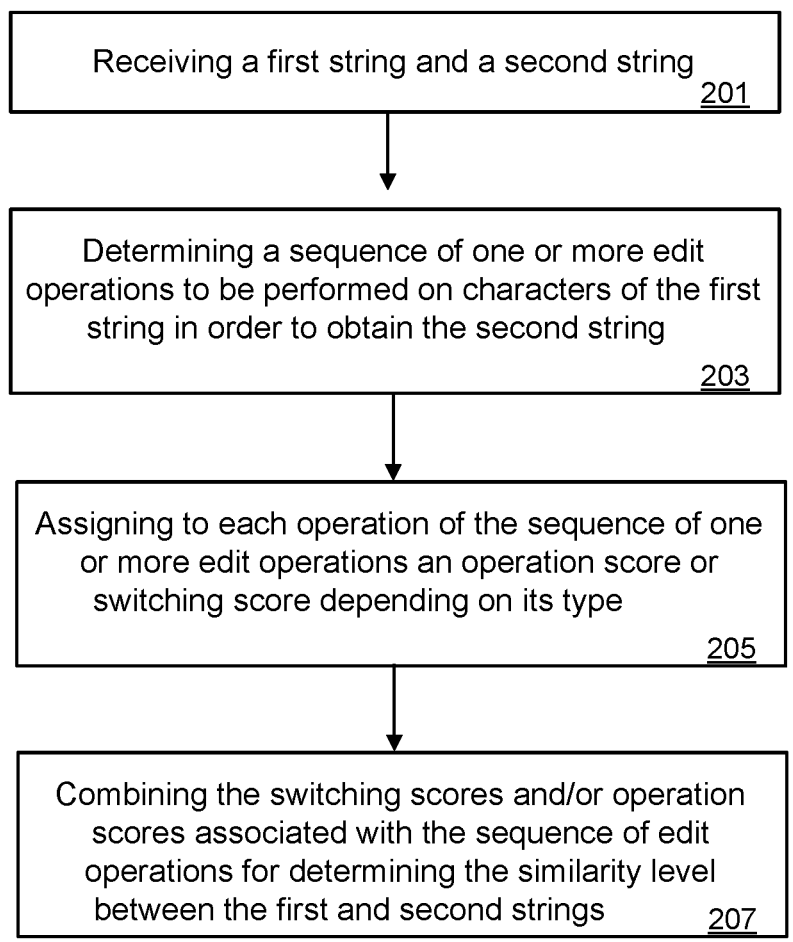
FIG. 2 is a flowchart of a method for determining a similarity between two strings in accordance with an example of the present subject matter.

FIG. 2 is a flowchart of a method for determining a similarity between two strings in accordance with an example of the present subject matter. For the purpose of explanation, the method described in FIG. 2 may be implemented in the system illustrated in FIG. 1, but is not limited to this implementation. The distance algorithm 120 may be configured to perform the method of FIG. 2.

A first string and a second string may be received in step 201. The first string comprises a sequence of $n_1$ characters and the second string comprises a sequence of $n_2$ characters.

A sequence of one or more edit operations to be performed on characters of the first string in order to obtain the second string may be determined in step 203. The determination of the sequence of edit operations may be performed in different ways. For example, in case of the second implementation example of the distance algorithm, the sequence of edit operations may be determined as described with reference to FIG. 4. The sequence of edit operations may be determined using previously computed scores e.g., as described with steps 403 to 409 of FIG. 4. This may particularly be advantageous in case the distance algorithm is called iteratively to compute the distance. In case of the first implementation example of the distance algorithm, the sequence of edit operations may be determined as described with reference to FIG. 3. In another example, a known technique such as the Levenshtein edit distance technique may be used to determine the sequence of edit operations.

Each operation of the sequence of one or more edit operations may be assigned in step 205 an operation score and potentially an additional switching score depending on the type of the edit operation. For example, if the operation is a first type edit operation it may be associated with an operation score indicative of a cost for applying the edit operation. In addition, if the operation is a first type edit operation which is immediately followed in the sequence by a second type edit operation it may further be associated with a switching score. In case of the iterative implementation of the distance algorithm, the previously assigned scores may be used in step 205 instead of assigning anew these scores to the previously processed edit operations. For example, if the sequence of edit operations for the current iteration is "DII", the combined score obtained in a previous iteration for the sequence "DI" may be used to compute the combined score for "DII" in this iteration.

The switching scores and/or operation scores associated with the sequence of edit operations may be combined in step 207. This may result in a combined score that is indicative of the similarity level between the first and second strings. The combined score may be an edit distance between the first string and the second string.

Figure 3:
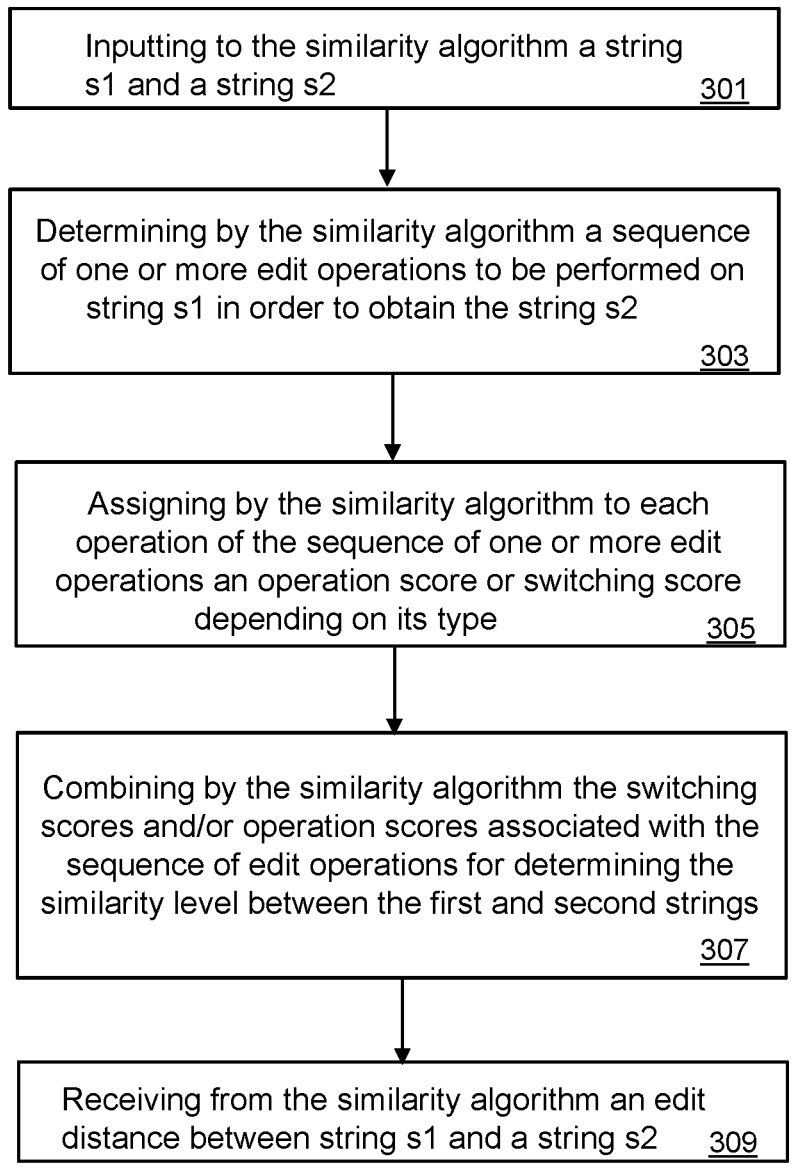
FIG. 3 is a flowchart of a method for determining a similarity between two strings in accordance with an example of the present subject matter.

FIG. 3 is a flowchart of a method for determining a similarity between two strings in accordance with an example of the present subject matter. For the purpose of explanation, the method described in FIG. 3 may be implemented in the system illustrated in FIG. 1, but is not limited to this implementation.

Two strings $s_1$ and $s_2$ may be input of the distance algorithm in step 301. The string $s_1$ of $N_1$ characters may be the first string of the distance algorithm and the string $s_2$ of $N_2$ characters may be the second string of the distance algorithm.

The distance algorithm may determine, in step 303, the sequence of edit operations for obtaining the second string $s_2$ from the first string $s_1$. This may, for example, be performed by sequentially processing character by character the first string $s_1$. The processing of each current character of the first string is performed by determining a current subsequence of characters of the first string $s_1$ that comprises the first x characters of the first string $s_1$ ending with the current character e.g., if the first string $s_1$ is "abcdef", and the current character is "c", then the determined current subsequence is "abc". Furthermore, the operation(s) to be performed on the current subsequence of characters of the first string $s_1$ in order to obtain a corresponding (same length) subsequence of the second string $s_2$ may be determined. For example, the second string "shop" may be obtained from the first string "soup" by first processing the first subsequence of characters "s" of "soup". This would indicate that "s" is to be maintained as it is the same as the corresponding subsequence "s" of the second string "shop". The following subsequence of characters "so" associated with character "o" may be processed in order to determine operations in order to obtain the corresponding subsequence "sh" from the second string "shop". This may result in inserting "h", resulting in edited first string "shoup". The following subsequence of characters "shou" associated with character "u" may be processed in order to determine operations for obtaining the corresponding subsequence "shop" of "shop". This may result in deleting "u", resulting in the edited first string "shop". The following subsequence of characters "shop" associated with the last character "p" may be processed in order to determine operations for obtaining the corresponding subsequence "shop" of the second string "shop". This may result in maintaining "p". The determined sequence of operations is therefore a sequence of 5 operations MIMDM.

The distance algorithm may apply in step 305 the score assignment rule on each operation of the determined sequence of edit operations. This may result in each edit operation of the sequence of edit operations having an operation score and optionally an additional switching score.

The distance algorithm may compute in step 307 an edit distance between the strings $s_1$ and $s_2$. The edit distance may, for example, be the sum of all scores assigned to the determined sequence of edit operations.

In step 309, the edit distance between the strings $s_1$ and $s_2$ may be received e.g., as an output of the distance algorithm.

Figure 4:
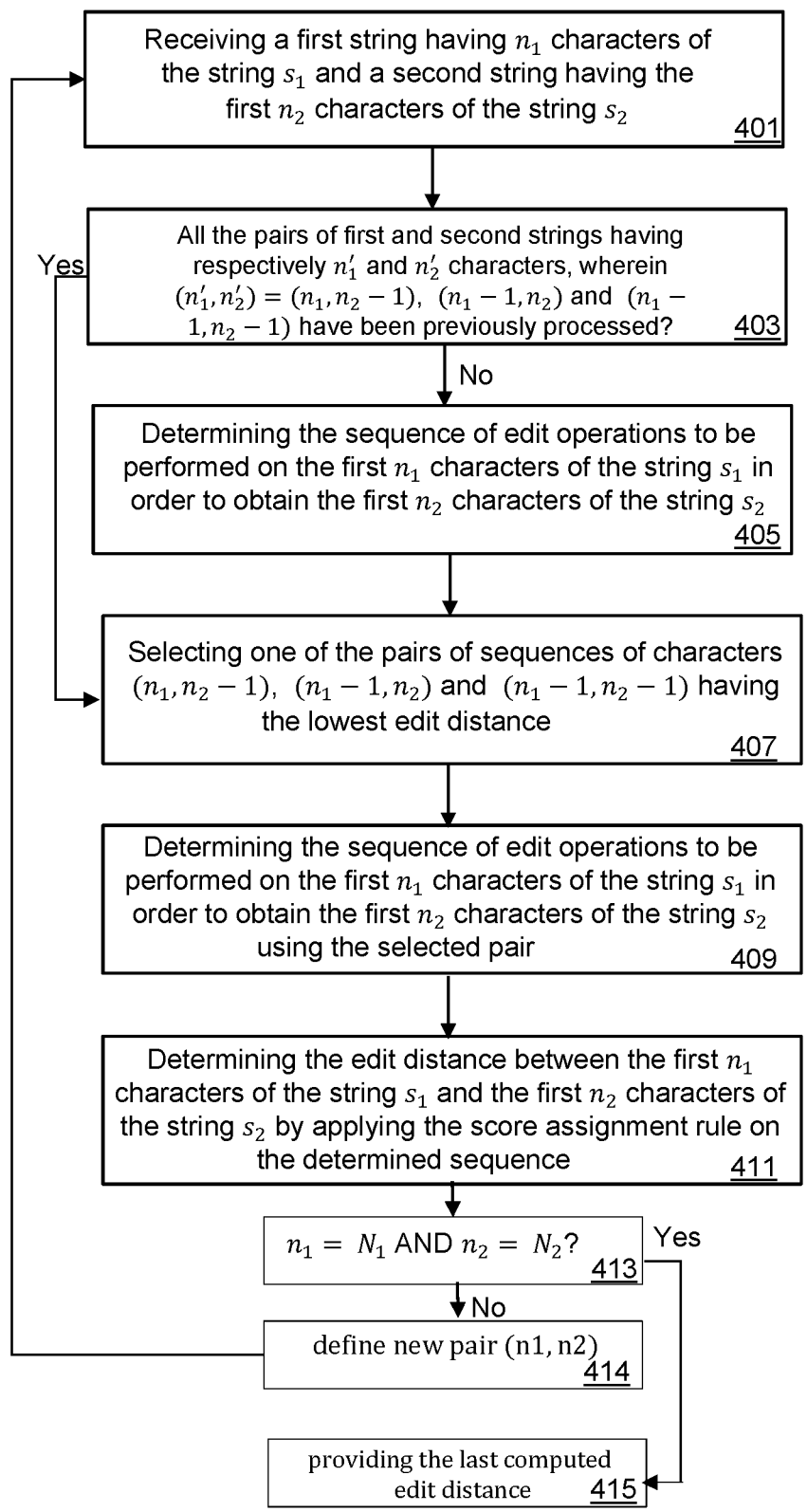
FIG. 4 is a flowchart of a method for determining a similarity between two strings in accordance with an example of the present subject matter.

FIG. 4 is a flowchart of a method for determining a similarity between two strings $s_1$ and $s_2$ in accordance with an example of the present subject matter. The string $s_1$ has $N_1$ characters and the string $s_2$ has $N_2$ characters. For the purpose of explanation, the method described in FIG. 4 may be implemented in the system illustrated in FIG. 1, but is not limited to this implementation.

The distance algorithm may receive in step 401 a first string having the first $n_1$ characters of the string $s_1$ and a second string having the first $n_2$ characters of the string $s_2$. Where $0 \leq n_1 \leq N_1$ and $0 \leq n_2 \leq N_2$. In the first execution of step 401, the distance algorithm may receive the first string having the first $n_1=0$ characters of the string $s_1$ and the second string having the first $n_2=0$ characters of the string $s_2$. That is, the distance algorithm may receive two empty characters.

The distance algorithm may check in step 403 whether it has determined in a previous iteration or initialized a combined score for the pairs (named surrounding pairs) of first and second strings having respectively $n_1' \geq 0$ and $n_2' \geq 0$ characters, wherein the surrounding pairs $(n_1', n_2')$ may comprise $(n_1'=n_1, n_2'=n_2-1)$ and/or $(n_1'=n_1-1, n_2'=n_2)$ pairs. The surrounding pairs $(n_1', n_2')$ may further comprise $(n_1'=n_1-1, n_2'=n_2-1)$ pair if the last character of the first string and the second string are the same. This condition may not be fulfilled only for the pairs $(n_1', n_2')$ where $n_1=0$ or $n_2=0$. In case one or more pairs (missing pairs) of the surrounding pairs have not been previously processed or have not been initialized with values, the distance algorithm may determine for each pair of the missing pairs in step 405 (from scratch) the one or more edit operations needed to obtain the $n_2'$ characters of the pair from the $n_1'$ characters of the pair. And a combined score may be computed for the missing pairs. Then step 407 may be performed.

In case the distance algorithm has previously processed said surrounding pairs of $n_1'$ and $n_2'$ characters meaning that the distance algorithm has previously computed the edit distance for the surrounding pairs of sequences of characters $(n_1, n_2-1)$ and/or $(n_1-1, n_2)$ and/or $(n_1-1, n_2-1)$ or has initialized said pairs with values, step 407 may be performed.

The distance algorithm may select in step 407 one of the surrounding pairs of sequences of characters $(n_1, n_2-1)$ and/or $(n_1-1, n_2)$ and/or $(n_1-1, n_2-1)$ having the lowest edit distance. The distance algorithm may have determined in the previous iteration for the selected pair $(n_1', n_2')$ a sequence of edit operations (named selected sequence of edit operations) to be performed on the first $n_1'$ characters of the string $s_1$ in order to obtain the first $n_2'$ characters of the string $s_2$. Thus, the distance algorithm may determine in step 409 or assume that the sequence of edit operations to be performed on the first $n_1$ characters of the string $s_1$ in order to obtain the first $n_2$ characters of the string $s_2$ is said selected sequence of edit operations plus one additional edit operation. This one additional operation may depend on the selected pair $(n_1', n_2')$. For example, if the selected pair is $(n_1',n_2')=(n_1,n_2-1)$, then the one additional edit operation is an insertion operation. If the selected pair is $(n_1',n_2')=(n_1-1,n_2)$, then the one additional edit operation is a removal operation. If the selected pair is $(n_1',n_2')=(n_1-1,n_2-1)$, then the one additional edit operation is a maintenance operation.

The distance algorithm may determine in step 411 the edit distance between the first $n_1$ characters of the string $s_1$ and the first $n_2$ characters of the string $s_2$ by applying the score assignment rule on the additional edit operation and eventually on the last edit operation of the selected sequence of edit operations, resulting in an additional score. And, the sum of the additional score with the edit distance between the first $n_1'$ characters of the string $s_1$ and the first $n_2'$ characters of the string $s_2$ may be provided as the edit distance between the first $n_1$ characters of the string $s_1$ and the first $n_2$ characters of the string $s_2$.

It may be determined (step 413) whether $n_1=N_1$ AND $n_2=N_2$. If so, the computed edit distance in step 411 may be provided in step 415 as an edit distance between the strings $s_1$ and $s_2$. Otherwise, a new pair of values of $(n_1, n_2)$ may be defined in step 414 and steps 401 to 415 may be repeated until $n_1=N_1$ and $n_2=N_2$ is reached. $n_1$ and $n_2$ may be incremented in each iteration according to a nested loop, where $n_1$ represents the outer loop and $n_2$ represents the inner loop.

FIG. 5A is a flowchart of an example method for determining the similarity between the string $s_1$="soup" having $N_1=4$ characters and the string $s_2$="shop" having $N_2=4$ characters using the second implementation example. For that, the method of FIG. 5A may use a matrix whose first dimension represents the characters of "soup" and whose second dimension represents the characters of "shop", but it is not limited to this matrix implementation. The matrix implementation may enable an efficient usage of the processing resources. Indeed, the method fills a matrix row by row so that instead of keeping the entire matrix one would only keep a single row in memory plus the updates to the current row. For example, if the first row of the matrix is currently stored in memory; the cells of the second row may be consecutively computed until the second row is completely computed. Next, the second row is in the memory, and the third row is filled and so on. Assuming, for example, that the operation score and the switching score are equal to one.

In step 501, the distance algorithm may create a matrix M, 520A of size $(N_1+1) \times (N_2+1)$ as shown in FIG. 5B. The last $N_2$ columns of the matrix represent the $N_2$ characters of the string $s_2$. The last $N_1$ rows of the matrix represent the $N_1$ characters of the string $s_1$. The additional first column and first row represent a special character $\epsilon$ representing the empty string. The first row indicates the cost values for obtaining the first $n_2$ characters of the string $s_2$ from an empty character e.g., the cost to obtain "sho" from an empty character is 3 which corresponds to three insertion operations each having a cost value of 1. The first column indicates the cost values for obtaining an empty character E from the first $n_1$ characters of the string $s_1$ e.g., the cost to obtain from "so" an empty character is 2 which corresponds to two removal operations each having a cost value of 1. In other words, the matrix M is initialized with initial cost values that may be used when comparing the strings $s_1$ and $s_2$.

Each cell of the matrix M has two corresponding first string and second string. As shown in FIG. 5B, the cell $M_{22}$ has the pair of first and second strings ("s", "s"), the cell $M_{23}$ has the pair of first and second strings ("s", "sh"), the cell $M_{55}$ has the pair of first and second strings ("soup", "shop") etc. The second implementation example of the distance algorithm may be performed by processing each cell of the cells e.g., $M_{22}$ to $M_{55}$ in one iteration in order to fill the cell with a cost value. The cost value in each cell indicates the edit distance between the first string and the second string associated with that cell.

The distance algorithm may execute steps 503 to 505 on each current cell $M_{ij}$ (i is a row index and j is a column index) having a corresponding upper cell $M_{i-1,j}$ left cell $M_{i,j-1}$ and diagonal cell $M_{i-1,j-1}$ (herein named surrounding cells) with a precomputed/initialized value (e.g., the surrounding cells may include the diagonal cell in case the character assigned to the row i and column j is the same). For example, in the matrix 520A only the cell $M_{22}$ has those surrounding cells filled with values and thus the distance algorithm may start with that cell $M_{22}$.

Hence, the distance algorithm may start with the cell $M_{22}$ having the pair of the first string and second string ("s", "s"). The distance algorithm may determine the cost for obtaining "s" from "s" which is zero since it involves a maintenance operation. This cost may be derived from the three cell values surrounding the cell $M_{22}$ e.g., the distance algorithm may determine that the upper cell value $M_{12}$ and the left cell value $M_{21}$ are equal to one and the diagonal cell value $M_{11}$ is zero. The distance algorithm may determine in step 503 the cost for traveling/moving from $M_{11}$ to $M_{22}$, from $M_{12}$ to $M_{22}$ and from $M_{21}$ to $M_{22}$ and select the lowest one. The cost for traveling from $M_{12}$ to $M_{22}$ is equal to the cost of cell $M_{12}$ plus the cost of the additional operation for deleting the character "s" which is 1+1=2. The cost for traveling from $M_{21}$ to $M_{22}$ is equal to the cost of the cell $M_{21}$ plus the cost of the additional operation for inserting the character "s" which is: 1+1=2. The cost for traveling from $M_{11}$ to $M_{22}$ is equal to the cost of cell $M_{11}$ plus the cost of the additional operation for maintaining the character "s" which is 0+0. Therefore, the distance algorithm may assign in step 505 to the cell $M_{22}$ the lowest value of zero. The value of cell $M_{22}$ is marked by an additional sign "+" in the resulting matrix 520B to indicate that the movement/traveling was along the diagonal to arrive at this cell $M_{22}$ (i.e., the operation was a maintenance operation). The matrix 520B comprises the resulting content after the first execution of the distance algorithm.

FIG. 5B shows the content of the matrix for different iterations of the distance algorithm. For example, the matrix 520C represents the status of the matrix before processing the current cell $M_{34}$ as indicated in FIG. 5B. As with cell $M_{22}$, the distance algorithm may determine that the upper cell value $M_{24}$ and the left cell value $M_{33}$ are equal to three and the diagonal cell value $M_{23}$ is two. The distance algorithm may determine in step 503 the cost for traveling from $M_{23}$ to $M_{34}$, from $M_{24}$ to $M_{34}$ and from $M_{33}$ to $M_{34}$ and select the lowest one. The cost for traveling from $M_{24}$ to $M_{34}$ is equal to the cost of the cell $M_{24}$ plus the cost of the additional operation for deleting the character "o" which is 3+1=4. The cost for traveling from $M_{33}$ to $M_{34}$ is equal to the cost of the cell $M_{33}$ plus the cost of the additional operation for inserting the character "o" which is: 3+1=4. The cost for traveling from $M_{23}$ to $M_{34}$ is equal to the cost of the cell $M_{23}$ plus the cost zero of the additional operation for maintaining the character "o" and the switching score 1 for switching to the maintenance operation, thus 2+1. Therefore, the distance algorithm may assign in step 505 to the cell $M_{34}$ the lowest value of 3. Since the value of $M_{34}$ is obtained from the corresponding diagonal cell it is marked by an additional sign "+" in the resulting matrix 520D. FIG. 5B shows the content of the matrix M 520E after the final iteration of the distance algorithm. In one example, the last row and last column of the matrix 520E may be saved so that they can be reused in case of comparing two strings comprising "soup" and "shop" respectively. For example, for computing the edit distance between the two strings "ϵsouppap" and "ϵshopping" having $N_3$ and $N_4$ characters respectively, a new $N_3 \times N_4$ matrix may be used, wherein only the cells of the last 4 columns and last 3 rows of the new matrix representing the two strings may be computed because the saved row and column may be used. This may, for example, be performed by repeatedly inputting the first $n_1$ characters of the string "ϵsouppap" and first $n_2$ characters of the string "ϵshopping" to the distance algorithm by changing in each iteration $n_1$ and $n_2$ to new values (as described above), wherein the values of $n_1$ iterate over the range $0 \ldots N_1$ while the values of $n_2$ iterate over the range $N_2+1 \ldots N_4$ (right quadrant of the new matrix) and subsequently the values of $n_1$ iterate over the range $N_1+1 \ldots N_3$ while the values of $n_2$ iterate over the range $0 \ldots N_4$ (lower two quadrants of the new matrix).

The distance algorithm may provide in step 507 the value of the bottom right cell $M_{55}$ as an edit distance between the string $s_1$="soup" and the string $s_2$="shop".

The present method of FIG. 5A may favor words where the edit operations are in the same location. Another way of putting this is favoring words that have a longer stretch of identical letters, i.e., in the matrix M a longer series were the computation progresses along the diagonal. There are between $2^{|s1|+|s2|-1}$ and $3^{|s1|+|s2|-1}$ different paths to get from the top left to the bottom right (allowing character replacement would always give $3^{|s1|+|s2|-1}$ possibilities). Hence, computing all the paths and finding the one with the longest running diagonal is NP complete. The present method, instead, may rely on adding a penalty to whenever there is a change to or from a diagonal progression through the matrix while building the matrix.

In another example, using the method of FIG. 5A for comparing the string $s_1$="shop" and the string $s_2$="shopping", the matrix 520F may be obtained. The matrix 520F gives a distance of 5 between $s_1$ and $s_2$ (essentially, progressing along the diagonal for "shop" as indicated in FIG. 5B adding a penalty for the deviation, and the 4 insertion operations of "p", "i", "n", "g"). Since the computed distance between $s_1$ and $s_2$ may have a value higher than the sum of the lengths of the two strings ($|s_1|+|s_2|$), the present method may avoid this by adopting the following. If both strings are empty, the similarity is 1. If not, it may be assumed without loss of generality that $s_1$ is the shorter string. Then at most $2|s_1|$ penalties may be introduced, if all characters in $s_1$ are contained in $s_2$ and at most $|s_2|-1$ penalties if $|s_2| \leq 2|s_1|$, i.e., there are not enough characters to add two penalties for each character in $s_1$.

Figure 6A:
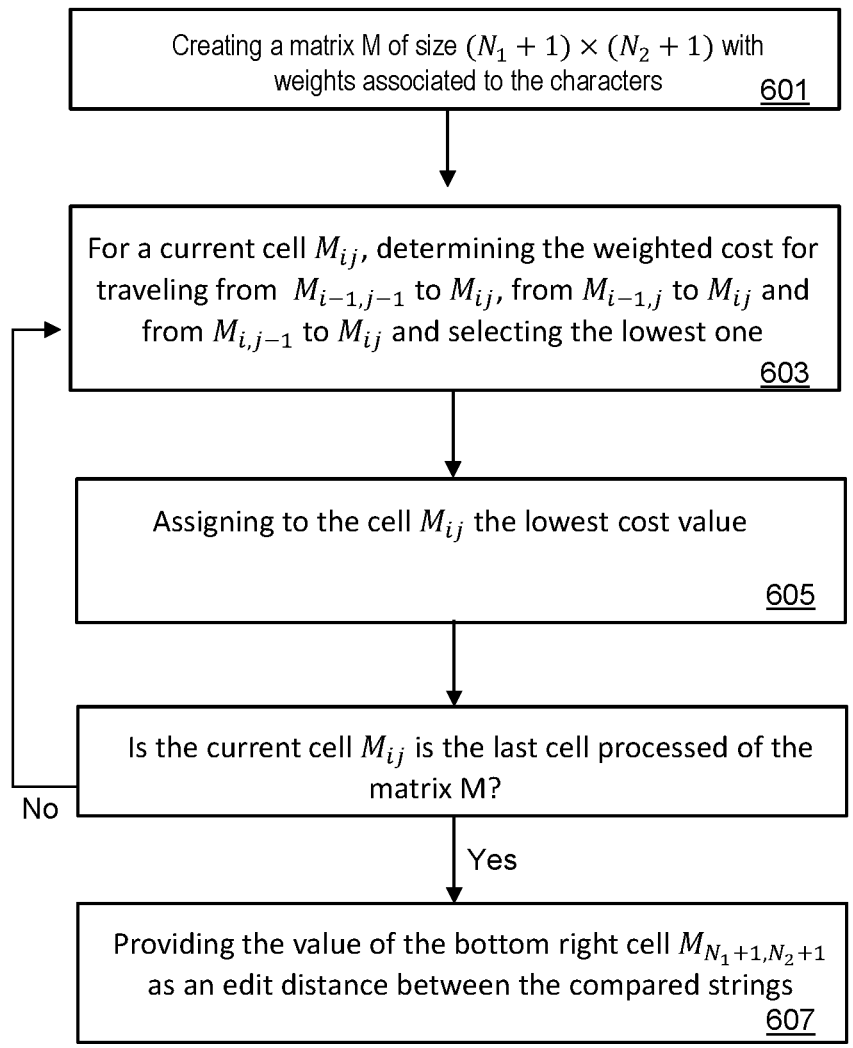
FIG. 6A is a flowchart of a method for determining a similarity between two strings in accordance with an example of the present subject matter.
Figure 6B:
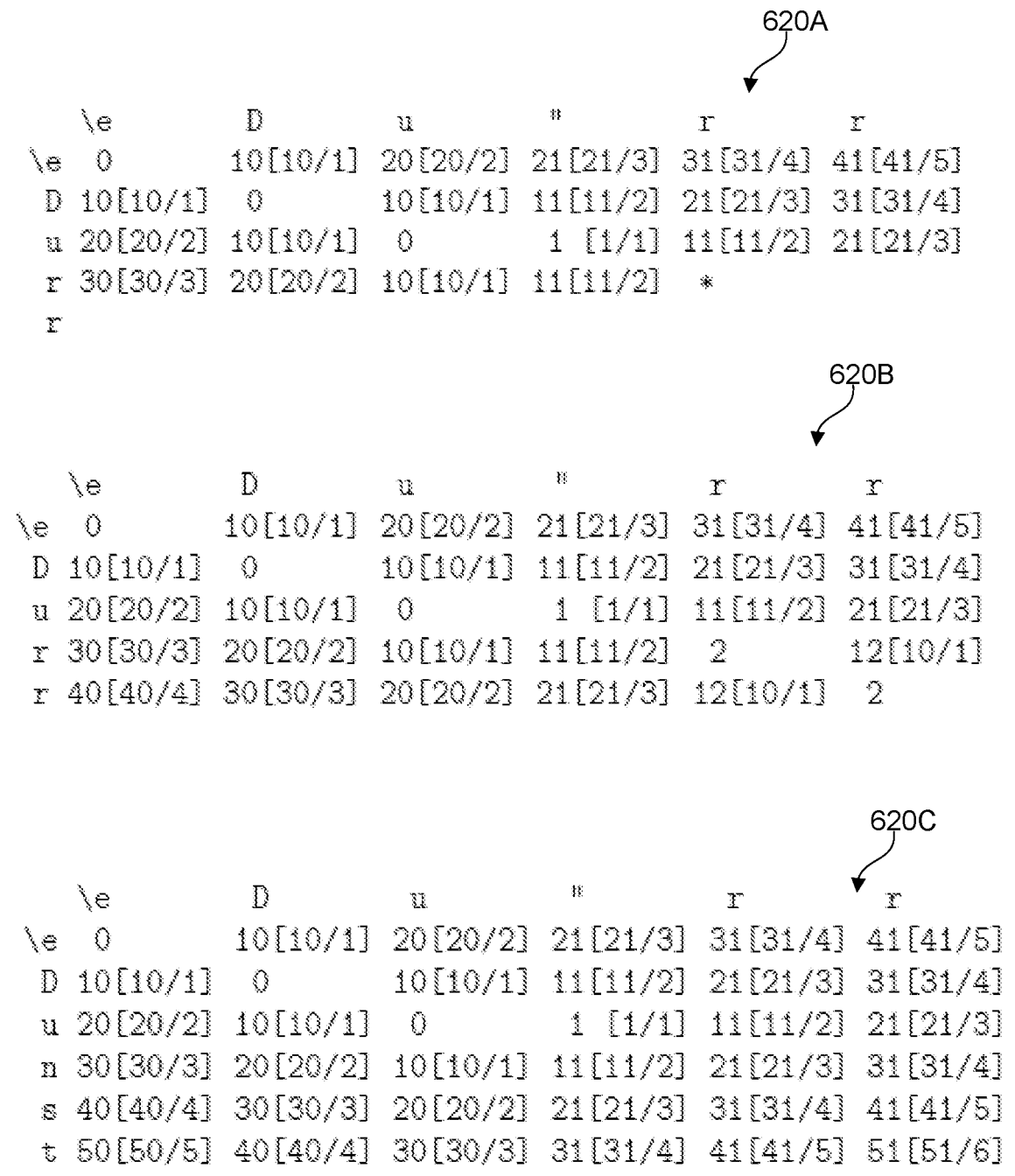

FIG. 6A is a flowchart of an example method for determining the similarity between the string $s_1$="Durr" having $N_1$=4 characters and the string $s_2$="Du¨ rr" having $N_2$=5 characters using the second implementation example. As with FIG. 5A, the method of FIG. 6A may use a matrix whose first dimension represents the characters of "Durr" and whose second dimension represents the characters of "Du¨ rr", but it is not limited to this matrix implementation. Assuming, in this example, that the operation score and the first type switching score are equal to one (the second type switching score may not be used in this example as this example involves character weights). The first type switching score may be weighted with the average character weight. In addition, each character of the strings $s_1$ and $s_2$ may be associated with a respective weight. This is indicated in FIG. 6B, where each of the characters is associated with a weight 10, except the character "¨" which is associated with a weight 1. However, in order to be able to assign the penalty in this implementation using the matrix, one record for each element in the matrix the number of insertion and removal operations that had been assigned as well as the combined score. This is indicated for each cell of the matrix by the pair [cost/len] where "cost" represents the combined score and "len" is the number of insertion and/or removal operations accrued so far. For example, the cell $M_{42}$ of the matrix 620A is associated with the pair [20/2] indicating the number of operations is 2 and that the combined score computed for the first string "Dur" and second string "D" by the distance algorithm is 20. The number of first type edit operations is 2 delete operations because the set of operations for obtaining "D" from "Dur" comprises one maintenance operation to maintain "D" and two delete operations to delete "u" and "r". The penalty may be calculated by dividing the total penalty "cost" by the number "len" of characters (to get the average character weight) and multiply this by a constant $p = w_{sw1} \times SC$. When the penalty is assigned, the number "len" of insertion and/or removal operations and the penalty "cost" accumulated so far is reset to zero because the corresponding penalty has already been integrated in the cost accumulated so far.

In step 601, the distance algorithm may create a matrix M, 620A of size $(N_1+1) \times (N_2+1)$ as shown in FIG. 6B. The last $N_2$ columns of the matrix represent the $N_2$ characters of the string $s_2$. The last $N_1$ rows of the matrix represent the $N_1$ characters of the string $s_1$. The additional first column and first row represent a special character representing the empty string. The first row indicates the cost values for obtaining the first $n_2$ characters of the string $s_2$ from an empty character e.g., the cost to obtain "Du¨" from an empty character is 21 which corresponds to three insertion operations each having a cost value of 1 and having weights 10, 10 and 1 respectively i.e., $10*1+10*1+1*1$. The first column indicates the cost values for obtaining an empty character from the first $n_1$ characters of the string $s_1$ e.g., the cost to obtain from "Du" an empty character is 20 which corresponds to two removal operations each having a cost value of 1 and a weight of 10 i.e., $10*1+10*1$. In other words, the matrix is initialized with initial cost values that may be used when comparing the strings $s_1$ and $s_2$.

Each cell of the matrix M has two corresponding first string and second string. As shown in FIG. 6B, the cell $M_{22}$ has the pair of first and second strings ("D", "D"), the cell $M_{23}$ has the pair of first and second strings ("D", "Du"), the cell $M_{56}$ has the pair of first and second strings ("Dun", "Du¨ rr") etc. The implementation of the distance algorithm may be performed by processing each cell of the cells e.g., $M_{22}$ to $M_{56}$ in one iteration in order to fill the cell with a cost value. The cost value in each cell indicates the edit distance between the first string and the second string associated with that cell.

The distance algorithm may execute steps 603 to 605 on each current cell $M_{ij}$ (i is a row index and j is a column index) having the corresponding surrounding cells $M_{i-1,j}$, $M_{i,j-1}$ and $M_{i-1,j-1}$ with a precomputed/initialized value e.g., the surrounding cells may include the diagonal cell $M_{i-1,j-1}$ in case the character assigned to the row i and column j is the same. For example, FIG. 6B shows the status of the matrix 620A after multiple iterations of the steps 603 to 605. In matrix 620A the distance algorithm may process the cell $M_{45}$ in the next iteration of step 603 to 605, as it operates on a row by row basis.

For a current cell $M_{ij}$, the distance algorithm may determine in step 603 the cost for traveling from $M_{i-1,j-1}$ to $M_{ij}$, from $M_{i-1,j}$ to $M_{ij}$ and from $M_{i,j-1}$ to $M_{ij}$ and select the lowest one. The cost for traveling from $M_{i-1,j-1}$ to $M_{ij}$ may be determined/considered in case the character assigned to the row i and column j is the same. The cost for traveling from $M_{i-1,j}$ to $M_{ij}$ is equal to the cost of the cell $M_{i-1,j}$ plus the cost of the additional operation for deleting the character assigned to the row i. The cost for traveling from $M_{i,j-1}$ to $M_{ij}$ is equal to the cost of the cell $M_{i,j-1}$ plus the cost of the additional operation for inserting the character assigned to assigned to the column j. The cost for traveling from $M_{i-1,j-1}$ to $M_{ij}$ is equal to the cost of the cell $M_{i-1,j-1}$ plus the cost induced by the additional operation for maintaining the same character assigned to the row i and column j. Therefore, the distance algorithm may assign in step 605 to the cell $M_{ij}$ the lowest cost value of the determined cost values. If for example, the lowest traveling cost is from $M_{i-1,j-1}$ to $M_{ij}$, the cost induced by the additional operation may be the first type switching score $w_{sw1} \times SC$ weighted by the average character weight $$w_c = \frac{\text{cost}}{\text{len}},$$

where [cost, len] are the recorded cost and number for the cell $M_{i-1,j-1}$. That is, the combined score for cell $M_{ij}$ may be equal to: $\text{cost}+w_c \times w_{sw1} \times SC$.

For example, with the content of matrix 620A of FIG. 6B, the distance algorithm may process the cell $M_{45}$ by determining in step 603 the cost for traveling from $M_{34}$ to $M_{45}$, from $M_{35}$ to $M_{45}$ and from $M_{44}$ to $M_{45}$ and select the lowest one. The cost for traveling from $M_{35}$ to $M_{45}$ is equal to the cost of the cell $M_{35}$ plus the cost of the additional operation for deleting the character "r" assigned to the row 4. The cost for traveling from $M_{44}$ to $M_{45}$ is equal to the cost of the cell $M_{44}$ plus the cost of the additional operation for inserting the character "r" assigned to assigned to the column 5. The cost for traveling from $M_{3,4}$ to $M_{45}$ is equal to the cost of the cell $M_{34}$ plus the cost induced by the additional operation for maintaining the same character "r" assigned to the row 4 and column 5, wherein the cost induced by the additional operation includes the first type switching score $w_{sw1} \times SC$ because the additional operation is of the second type and the last operation is of the first type, wherein the first type switching score is weighted with the average character weight associated with the cell $M_{34}$, i.e., $w_c=\text{cost/len}=1/1=1$. Therefore, the distance algorithm may assign in step 505 to the cell $M_{45}$ the lowest cost value 2.

The content of the matrix 520B is the resulting content after processing all cells of the matrix. The distance algorithm may provide in step 607 the value of the bottom right cell $M_{56}$ as an edit distance between the string $s_1$="Durr" and the string $s_2$="Du¨ rr". FIG. 6B shows another matrix 620C that is the result of performing the iterative implementation of the distance algorithm between the string $s_1$="Durst" and the string $s_2$="Du¨ rr".

In one example, multiple similarity metrics s1, s2, . . . , sn may be combined. For that the following formula may be used: sc=0.9max(s1, . . . , sn)+0.1 min(s1, . . . , sn). With this approach, different similarity metrics can capture different aspects of the similarity between two strings. For example, the Levenshtein function may capture the edit distance, whereas the Jaccard similarity can deal with word permutations. On the other hand, the Jaccard similarity function can return a similarity of 1.0 for strings that differ which may not be desirable. Hence, instead of simply using the maximum, one combine the function by combining the maximum and the minimum of the functions. The use of the approach presented in this disclosure may led to an increase of 7% of recall (85 to 92%).

Figure 7:
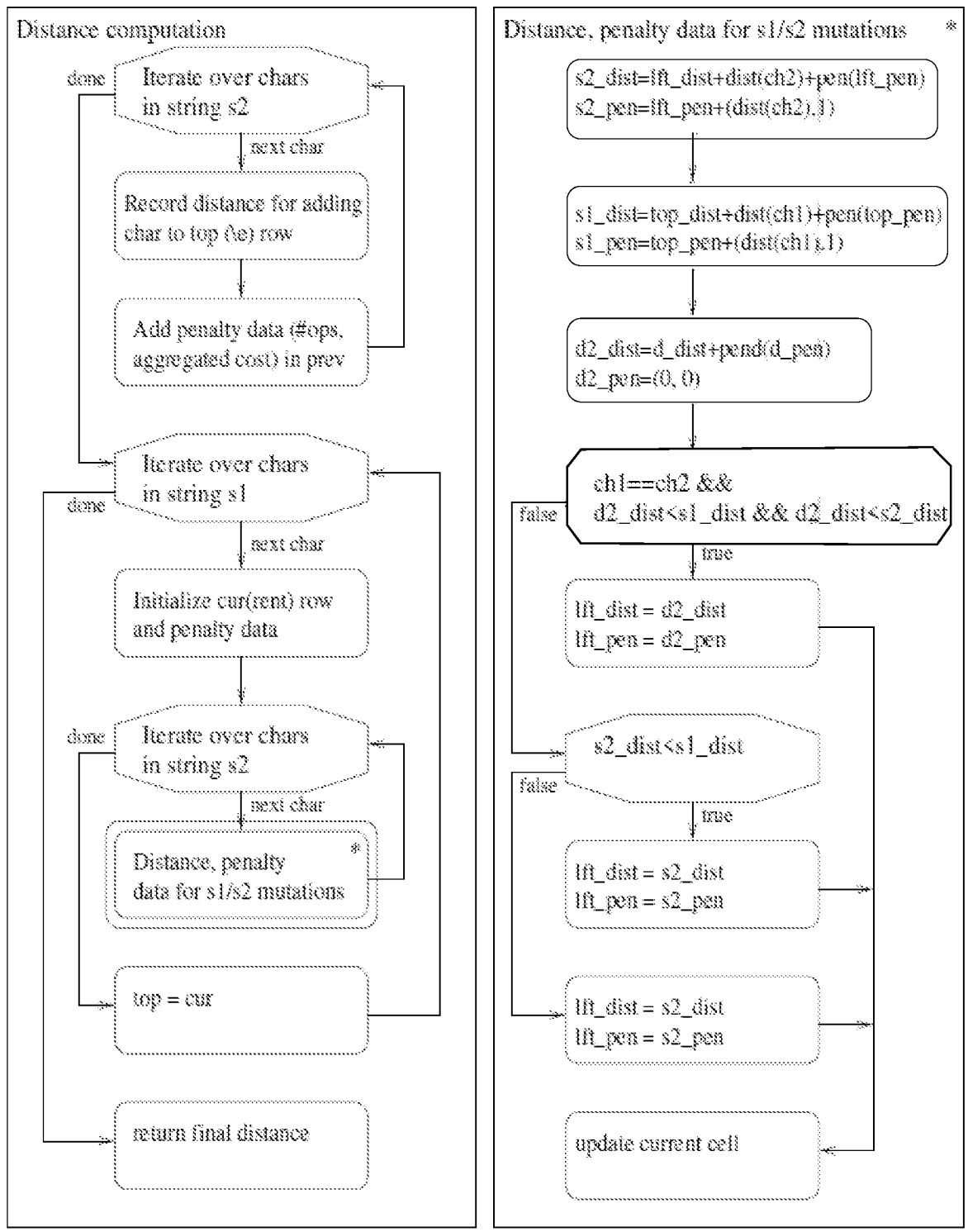
FIG. 7 is a pseudocode for determining a similarity between two strings in accordance with an example of the present subject matter.

FIG. 7 shows in pseudo-code the elements of an example workflow of the matrix-based string comparison method for comparing strings $s_1$ and $s_2$. It assumes that the strings have been preprocessed and the initial values associated with the empty string element (i.e., the values of the first column and the first row of the matrix) has already been added to the string in a suitable way. It also uses the two penalty functions pen( ) and pend( ). The pseudo code uses a matrix implementation to obtain the edit distance between the strings $s_1$ and $s_2$. "(\e) row" refers to the empty row e.g., such as the first row of matrix 520A. "prev" refers to previous character. "cur" refers to current row of the matrix. "top" refers to the top row. "ch1" and "ch2" refer to the characters of the strings $s_1$ and $s_2$ respectively, "ch1" and "ch2 are assigned to the row and column of the current cell respectively.

"s2_dist" and "s2_pen" are the distance and penalty for a current cell using the left cell, i.e., the cell on the same row but on the left column of the current cell. lft_dist refers to the distance assigned to the left cell. lft_pen refers to the penalty assigned to the left cell.

"s1_dist" and "s1_pen" are the distance and penalty for the current cell using the top cell, i.e., the cell on the same column but on the top row of the current cell. top_dist refers to the distance assigned to the top cell. top_pen refers to the penalty assigned to the top cell.

"d2_dist" and "d2_pen" are the distance and penalty for the current cell using the diagonal cell i.e., the cell on the left column and on the top row of the current cell. d_dist refers to the distance assigned to the diagonal cell. d_pen refers to the penalty assigned to the diagonal cell.

The penalty refers to the switching score described herein and the distance refers to the operation scores.

The function pen( ) returns the penalty if the penalty object passed to it has a length of zero representing the transition from a diagonal movement to a lateral movement (representing the second switching type). Depending on whether the weighted version is implemented or not, this may return zero or some penalty to be assigned. The function pend( ) returns the average penalty captured by the penalty object representing the transition from a lateral movement to a diagonal movement (representing the first switching type). Depending on whether the weighted version is implemented or not, this returns the accumulated distance in the penalty object divided by the characters in the penalty object. In the weighted version of the code, depending on the penalty that can be accrued, it may be beneficial to force following the diagonal line by changing the condition "ch1==ch2 && d2_dist<s1_dist && && d2_dist<s2_dist". by the condition "ch1==ch2".

Figure 8:
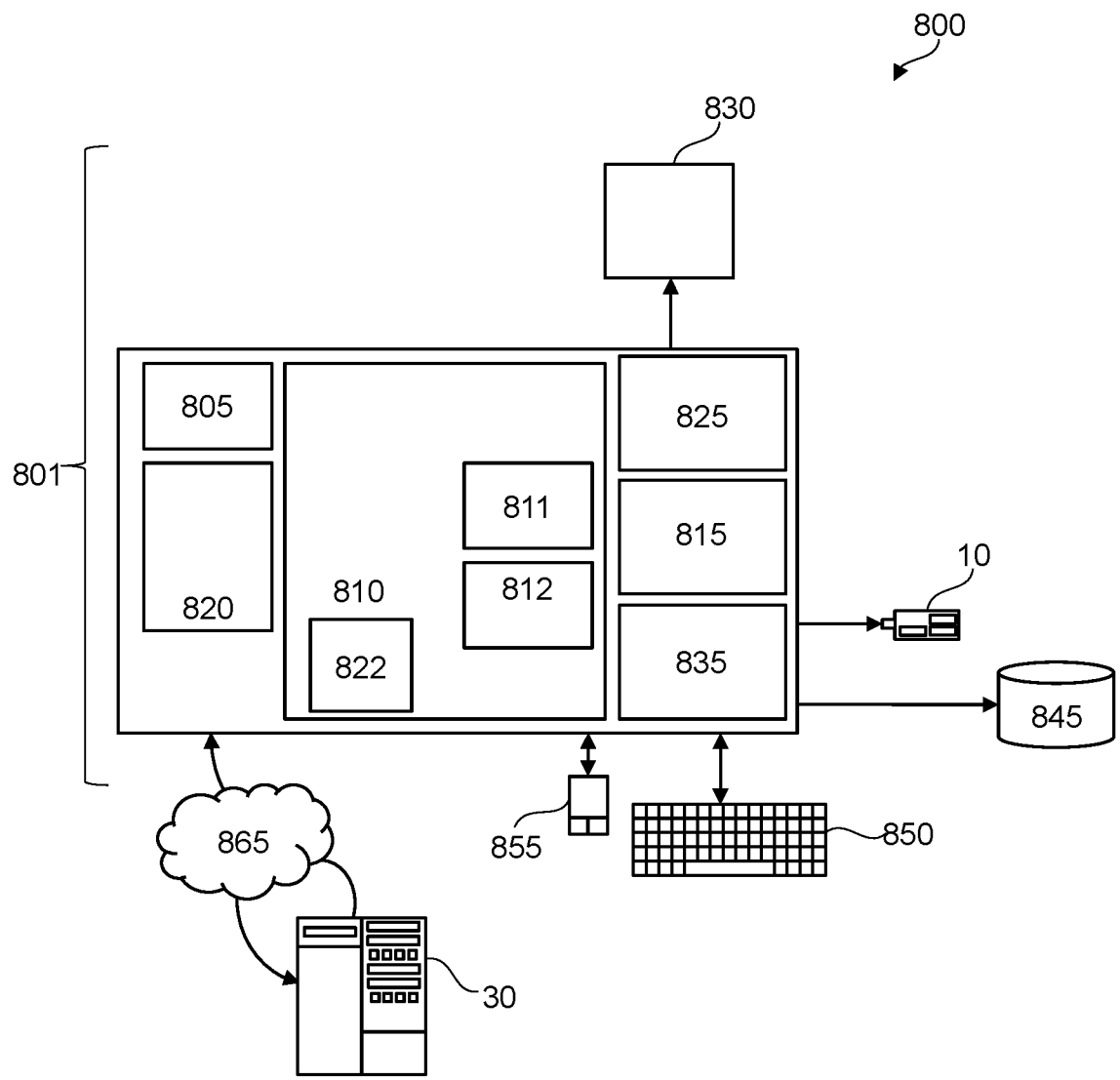
FIG. 8 represents a computerized system, suited for implementing one or more method steps as involved in the present disclosure.

FIG. 8 represents a general computerized system 800 (e.g., the data integration system) suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 812, 822 (including firmware 822), hardware (processor) 805, or a combination thereof. In exemplary embodiments, the methods described herein are implemented in software, as an executable program, and is executed by a special or general-purpose digital computer, such as a personal computer, workstation, minicomputer, or mainframe computer. The most general system 800 therefore includes a general-purpose computer 801.

In exemplary embodiments, in terms of hardware architecture, as shown in FIG. 8, the computer 801 includes a processor 805, memory (main memory) 810 coupled to a memory controller 815, and one or more input and/or output (I/O) devices (or peripherals) 10, 845 that are communicatively coupled via a local input/output controller 835. The input/output controller 835 can be, but is not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 845 may generally include any generalized cryptographic card or smart card known in the art.

The processor 805 is a hardware device for executing software, particularly that stored in memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing software instructions.

The memory 810 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 810 can have a distributed architecture, where various components are situated remote from one another, but can be accessed by the processor 805.

The software in memory 810 may include one or more separate programs, each of which comprises an ordered listing of executable instructions for implementing logical functions, notably functions involved in embodiments of this disclosure. In the example of FIG. 8, software in the memory 810 includes instructions 812 e.g. instructions to manage databases such as a database management system.

The software in memory 810 shall also typically include a suitable operating system (OS) 811. The OS 811 essentially controls the execution of other computer programs, such as possibly software 812 for implementing methods as described herein.

The methods described herein may be in the form of a source program 812, executable program 812 (object code), script, or any other entity comprising a set of instructions 812 to be performed. When a source program, then the program needs to be translated via a compiler, assembler, interpreter, or the like, which may or may not be included within the memory 810, so as to operate properly in connection with the OS 811. Furthermore, the methods can be written as an object-oriented programming language, which has classes of data and methods, or a procedure programming language, which has routines, subroutines, and/or functions.

In exemplary embodiments, a conventional keyboard 850 and mouse 855 can be coupled to the input/output controller 835. Other output devices such as the I/O devices 845 may include input devices, for example but not limited to a printer, a scanner, microphone, and the like. Finally, the I/O devices 10, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 845 can be any generalized cryptographic card or smart card known in the art. The system 800 can further include a display controller 825 coupled to a display 830. In exemplary embodiments, the system 800 can further include a network interface for coupling to a network 865. The network 865 can be an IP-based network for communication between the computer 801 and any external server, client and the like via a broadband connection. The network 865 transmits and receives data between the computer 801 and external systems 30, which can be involved to perform part, or all of the steps of the methods discussed herein. In exemplary embodiments, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the software in the memory 810 may further include a basic input output system (BIOS) 822. The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute software 812 stored within the memory 810, to communicate data to and from the memory 810, and to generally control operations of the computer 801 pursuant to the software. The methods described herein and the OS 811, in whole or in part, but typically the latter, are read by the processor 805, possibly buffered within the processor 805, and then executed.

When the systems and methods described herein are implemented in software 812, as is shown in FIG. 8, the methods can be stored on any computer readable medium, such as storage 820, for use by or in connection with any computer related system or method. The storage 820 may comprise a disk storage such as HDD storage.

The present subject matter may provide the following clauses.

Clause 1. A method for determining a distance between a string $s_1$ having $N_1$ characters, where $N_1 \geq 0$ and a string $s_2$ having $N_2$ characters, where $N_2 \geq 0$, the method comprising:

a. providing a distance algorithm being configured for:
   i. receiving a first string and a second string;
   ii. determining a sequence of one or more edit operations to be performed on characters of the first string in order to obtain the second string, the edit operation being of a first type or a second type, the first type edit operation comprising a character insertion operation or character removal operation, the second type edit operation comprising a character maintenance operation; wherein the first type edit operation is associated with an operation score indicative of a cost for applying the edit operation; wherein the first type edit operation is associated with a switching score indicative whether it is immediately followed in the sequence by a second type edit operation;
   iii. combining the switching scores and/or operation scores associated with the sequence of edit operations, resulting in a combined score that is indicative of the similarity level between the first and second strings;
b. inputting first $n_1$ characters of the string $s_1$ as the first string and first $n_2$ characters of the string $s_2$ as the second string to the distance algorithm for obtaining the combined score, wherein $0 \leq n_1 \leq N_1$ and $0 \leq n_2 \leq N_2$;
c. determining of the distance between the string $s_1$ and string $s_2$ using the obtained combined score.

Clause 2. The method of clause 1, wherein in case $n_1 = N_1$ and $n_2 = N_2$, the obtained combined score is indicative of the distance between the string $s_1$ and string $s_2$.

Clause 3. The method of clause 1, wherein $n_1 = 0$ and $n_2 = 0$; the inputting further comprising:
repeatedly inputting the first $n_1$ characters of the string $s_1$ and first $n_2$ characters of the string $s_2$ to the distance algorithm, wherein $n_1$ and $n_2$ are incremented according to a nested loop, where $n_1$ represents the outer loop and $n_2$ represents the inner loop;
wherein the distance algorithm is configured for determining the sequence of edit operations in each iteration by:
   determining whether:
      a first combined score has been previously determined for the first string having $n_1 - 1$ characters and the second string having $n_2$ characters using a first sequence of the edit operations, and/or
      a second combined score was previously determined for the first string having $n_1$ characters and the second string having $n_2 - 1$ characters using a second sequence of the edit operations, and/or
      a third combined score was previously determined for the first string having $n_1 - 1$ characters and the second string having $n_2 - 1$ characters using a third sequence of the edit operations, the last character of the first string and the second string being the same;
   determining a combined score of the first, second and third combined scores if it was not previously determined and selecting the lowest score of the determined combined scores;
   determining an additional operation to be performed in addition to one of the first, second or third sequence of edit operations associated with the selected lowest score in order to obtain the second string from the first string, wherein if the selected pair is $(n_1, n_2 - 1)$, the additional operation is the insertion operation, and if the selected pair is $(n_1 - 1, n_2)$, the additional operation is the removal operation and if the selected pair is $(n_1 - 1, n_2 - 1)$, the additional operation is the maintenance operation.
   wherein the sequence of edit operations comprises the one of the first, second or third sequence of edit operations associated with the selected lowest score and the determined additional operation;
   wherein the distance algorithm is configured in each iteration for combining the switching scores and/or the operation scores associated with the sequence of edit operations by combining the lowest score with the switching score and/or the operation score associated with the additional operation.
wherein the determining of the distance between the string $s_1$ and string $s_2$ is performed using the obtained combined score of the last iteration.

Clause 4. The method of clause 3, further comprising providing initial values of the combined scores for pairs of first and second strings having respectively $n_1$ and $n_2$ characters, wherein $n_1 = 0$ and $n_2 = 0, 1, \ldots N_2$; or $n_2 = 0$ and $n_1 = 0, 1, \ldots N_1$.

Clause 5. The method of clause 3 or 4, further comprising: saving the combined scores computed for each pair of first string having $n_1$ = characters and second string having $n_2$ varying from 1 to $N_2$ characters, and the combined scores computed for each pair of first string having $n_1$ varying from 1 to $N_1$ characters and second string having $n_2 = N_2$ characters;
receiving a request to compare two strings $s_3$ and $s_4$ having $N_3$ and $N_4$ characters respectively, wherein $s_3 = s_1 + m_1$ and $s_4 = s_2 + m_2$, wherein $m_1$ and $m_2$ are strings of zero or more characters;
repeating the method using the saved scores, by repeatedly inputting the first $n_1$ characters of the string $s_3$ and first $n_2$ characters of the string $s_4$ to the distance algorithm, wherein the values of $n_1$ iterate over the range $0 \ldots N_1$ while the values of $n_2$ iterate over the range $N_2 + 1 \ldots N_4$ and subsequently the values of $n_1$ iterate over the range $N_1 + 1 \ldots N_3$ while the values of $n_2$ iterate over the range $0 \ldots N_4$.

Clause 6. The method of any of the preceding clauses 1 to 6, further comprising providing a character weight to each character of the strings $s_1$ and $s_2$, wherein the association of the operation score to the first type edit operation comprises weighting the association score with the character weight of the character involved in the first type edit operation.

Clause 7. The method of any of the preceding clauses 1 to 6, further comprising providing a character weight to each character of the string $s_1$ and the string $s_2$, wherein the association of the operation score to the first type edit operation comprises weighting the operation score with the character weight of the character involved in the first type edit operation, wherein the association of the switching score to the first type edit operation comprises weighting the switching score with a weight $w_c$, the weight $w_c$ being a predefined function of the combined score of a subsequence of operations having as last operation said first type edit operation and the number of first type edit operations in said subsequence.

Clause 8. The method of clause 7, the function being a ratio of the combined score and the number of first type edit operations in said subsequence.

Clause 9. The method of any of the preceding clauses 1 to 8, the switching score being referred to as first type switching score, the distance algorithm being further configured for: associating to each first type edit operation of the sequence of edit operations a second type switching score if it is immediately preceded in the sequence by a second type edit operation.

Clause 10. The method of any of the preceding clauses 1 to 9, wherein the determining of the sequence of operations and the association of the operation scores and the deviation scores are performed character wise in parallel.

Clause 11. The method of any of the preceding clauses 1 to 5, wherein $N_1 \geq 1$ and $N_2 \geq 1$, wherein the distance is converted into a similarity measure according to the following formula:

$$s_{gl} = 1.0 - \frac{d_{gl}(s_1, s_2)}{|s_1| + |s_2| + p \, \min(2|s_1|, |s_2| - 1)},$$

where p is the switching score, and $d_{gl}(s_1,s_2)$ is the combined score.

Clause 12. The method of any of the preceding clauses 1 to 11, wherein the string $s_1$ is shorter than string $s_2$.

Clause 13. The method of any of the preceding clauses 6 to 10, wherein $N_1 \geq 1$ and $N_2 \geq 1$, wherein the similarity level is further determined according to the following distance:

$$s_{gl} = 1.0 - \frac{d_{gl}(s_1, s_2)}{|s_1| + |s_2| + p\overline{w} \, \min(2|s_1|, |s_2| - 1)},$$

where $\overline{w}$ is an average character weight of the strings s1 and s2, where $d_{gl}(s_1,s_2)$ is the combined score and p is the switching score.

Clause 14. The method of any of the preceding clauses 1 to 13, the switching score being smaller than the sum of the operation scores for one character insertion operation and one character removal operation.

Clause 15. The method of any of the preceding clauses 1 to 14, the distance algorithm being configured to determine the sequence of one or more edit operations by determining different candidate sequences of edit operations and selecting the candidate sequence that provides the lowest combined score.

A method for determining a distance between a string $s_1$ having $N_1$ characters, where $N_1 \geq 1$ and a string $s_2$ having $N_2$ characters, where $N_2 \geq 1$ is provided. The method comprises:
  a. providing a distance algorithm being configured for:
    i. receiving a first string and a second string;
    ii. determining a sequence of one or more edit operations to be performed on characters of the first string in order to obtain the second string, the edit operation being of a first type or a second type, the first type edit operation comprising a character insertion operation or character removal operation, the second type edit operation comprising a character maintenance operation; wherein the first type edit operation is associated with an operation score indicative of a cost for applying the edit operation; wherein the first type edit operation is associated with a switching score indicative whether it is immediately followed in the sequence by a second type edit operation;
    iii. combining the switching scores and/or operation scores associated with the sequence of edit operations, resulting in a combined score that is indicative of the similarity level between the first and second strings;
  b. inputting first $n_1$ characters of the string $s_1$ as the first string and first $n_2$ characters of the string $s_2$ as the second string to the distance algorithm for obtaining the combined score, wherein $1 \leq n_1 \leq N_1$ and $1 \leq n_2 \leq N_2$;
  c. determining of the distance between the string $s_1$ and string $s_2$ using the obtained combined score.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for programmatically determining a distance between a string $s_1$ having $N_1$ characters, where $N_1 \geq 0$ and a string $s_2$ having $N_2$ characters, where $N_2 \geq 0$, the method comprising:

providing, to a computer system, a distance algorithm configured to be executed by the computing system, to:
receive a first string and a second string;
determine a sequence of one or more edit operations to be performed on characters of the first string in order to obtain the second string, the edit operation being of a first type and/or a second type, the first type edit operation comprising a character insertion operation and/or character removal operation, the second type edit operation comprising a character maintenance operation; wherein the first type edit operation is associated with an operation score indicative of a cost for applying the edit operation; wherein the first type edit operation is associated with a switching score indicative whether it is immediately followed in the sequence by a second type edit operation;
combining the switching scores and/or operation scores associated with the sequence of edit operations, resulting in a combined score that is indicative of the similarity level between the first and second strings;
inputting first $n_1$ characters of the string $s_1$ as the first string and first $n_2$ characters of the string $s_2$ as the second string to the distance algorithm for obtaining the combined score, wherein $0 \leq n_1 \leq N_1$ and $0 \leq n_2 \leq N_2$;
repeatedly inputting the first $n_1$ characters of the string $s_1$ and first $n_2$ characters of the string $s_2$ to the distance algorithm, wherein $n_1$ and $n_2$ are incremented according to a nested loop, where $n_1$ represents the outer loop and $n_2$ represents the inner loop;
wherein the distance algorithm is configured for determining the sequence of edit operations in each iteration by:
determining whether:
a first combined score has been previously determined for the first string having $n_1-1$ characters and the second string having $n_2$ characters using a first sequence of the edit operations, and/or
a second combined score was previously determined for the first string having $n_1$ characters and the second string having $n_2-1$ characters using a second sequence of the edit operations, and/or
a third combined score was previously determined, using a third sequence of the edit operations, for the first string having $n_1-1$ characters and the second string having $n_2-1$ characters, and the last character of the first string and the second string being the same;
determining a combined score of the first, second and third combined scores if it is determined that it was not previously determined and selecting the lowest score of the determined combined scores;
determining an additional operation to be performed in addition to one of the first, second or third sequence of edit operations associated with the selected lowest score in order to obtain the second string from the first string, wherein if the selected pair is $(n_1, n_2-1)$, the additional operation is the insertion operation, and if the selected pair is $(n_1-1, n_2)$ the additional operation is the removal operation and if the selected pair is $(n_1-1, n_2-1)$, the additional operation is the maintenance operation;

wherein the sequence of edit operations comprises the one of the first, second or third sequence of edit operations associated with the selected lowest score and the determined additional operation;

wherein the distance algorithm is configured in each iteration for combining the switching scores and/or the operation scores associated with the sequence of edit operations by combining the lowest score with the switching score and/or the operation score associated with the additional operation; and wherein the determining of the distance between the string $s_1$ and string $s_2$ is performed using the obtained combined score of the last iteration;

executing by the computer system the distance algorithm to determine the distance between the first string and the second string using the combined score; and implementing at least one action by the computer system based upon the determined distance.

2. The method of claim 1, wherein in case $n_1=N_1$ and $n_2=N_2$, the obtained combined score is indicative of the distance between the string $s_1$ and string $s_2$.

3. The method of claim 1, further comprising providing initial values of the combined scores for pairs of first and second strings having respectively $n_1$ and $n_2$ characters, wherein $n_1=0$ and $n_2=0, 1, \ldots N_2$; or $n_2=0$ and $n_1=0, 1, \ldots N_1$.

4. The method of claim 1, further comprising:

saving the combined scores computed for each pair of first string having $n_1=N_1$ characters and second string having $n_2$ varying from 0 to $N_2$ characters, and the combined scores computed for each pair of first string having $n_1$ varying from 0 to $N_1$ characters and second string having $n_2=N_2$ characters;

receiving a request to compare two strings $s_3$ and $s_4$ having $N_3$ and $N_4$ characters respectively, wherein $s_3=s_1+m_1$ and $s_4=s_2+m_2$, wherein $m_1$ and $m_2$ are strings of zero or more characters; and repeating the method using the saved scores, by repeatedly inputting the first $n_1$ characters of the string $s_3$ and first $n_2$ characters of the string $s_4$ to the distance algorithm, wherein the values of $n_1$ iterate over the range $0 \ldots N_1$ while the values of $n_2$ iterate over the range $N_2+1 \ldots N_4$ and subsequently the values of $n_1$ iterate over the range $N_1+1 \ldots N_3$ while the values of $n_2$ iterate over the range $0 \ldots N_4$.

5. The method of claim 1, further comprising providing a character weight to each character of the strings $s_1$ and $s_2$, wherein the association of the operation score to the first type edit operation comprises weighting the association score with the character weight of the character involved in the first type edit operation.

6. The method of claim 4, further comprising providing a character weight to each character of the string $s_1$ and the string $s_2$, wherein the association of the operation score to the first type edit operation comprises weighting the operation score with the character weight of the character involved in the first type edit operation, wherein the association of the switching score to the first type edit operation comprises weighting the switching score with a weight $w_c$, the weight $w_c$ being a predefined function of the combined score of a subsequence of operations having as last operation said first type edit operation and the number of first type edit operations in said subsequence.

7. The method of claim 6, the function being a ratio of the combined score and the number of first type edit operations in said subsequence.

8. The method of claim 1, the switching score being referred to as first type switching score, the distance algorithm being further configured for: associating to each first type edit operation of the sequence of edit operations a second type switching score if it is immediately preceded in the sequence by a second type edit operation.

9. The method of claim 1, wherein the determining of the sequence of operations and the association of the operation scores and the deviation scores are performed character wise in parallel.

10. The method of claim 1, wherein $N_1 \geq 1$ and $N_2 \geq 1$, wherein the distance is converted into a similarity measure according to:

$$s_{gl} = 1.0 - \frac{d_{gl}(s_1, s_2)}{|s_1|+|s_2|+p\ \min(2|s_1|, |s_2|-1)},$$

where p is the switching score, and $d_{gl}(s_1,s_2)$ is the combined score.

11. The method of claim 1, wherein the string $s_1$ is shorter than string $s_2$.

12. The method of claim 5, wherein $N_1 \geq 1$ and $N_2 \geq 1$, wherein the similarity level is further determined according to:

$$s_{gl} = 1.0 - \frac{d_{gl}(s_1, s_2)}{|s_1|+|s_2|+p\overline{w}\ \min(2|s_1|, |s_2|-1)},$$

where $\overline{w}$ is an average character weight of the strings s1 and s2, where $d_{gl}(s_1,s_2)$ is the combined score and p is the switching score.

13. The method of claim 1, the switching score being smaller than the sum of the operation scores for one character insertion operation and one character removal operation.

14. The method of claim 1, the distance algorithm being configured to determine the sequence of one or more edit operations by determining different candidate sequences of edit operations and selecting the candidate sequence that provides the lowest combined score.

15. A record matching method comprising comparing pairs of attributes values of two records using the method of claim 1 resulting in individual similarity levels of the attributes and combining the individual similarity levels for determining whether the two records are matching records.

16. A computer program product comprising a computer-readable storage medium having computer-readable program code embodied therewith, the computer-readable program code configured to implement the method of claim 1.

17. A computer system for determining a similarity between a string $s_1$ having $N_1$ characters, where $N_1 \geq 0$ and a string $s_2$ having $N_2$ characters, where $N_2 \geq 0$, comprising:

a memory;

a processor;

local data storage having stored thereon computer executable code, wherein the computer executable code includes the program instruction executable by a processor to cause the processor to perform a method, the method comprising:

providing a distance algorithm being configured for:
  receiving a first string and a second string;
  determining a sequence of one or more edit operations to be performed on characters of the first string in order to obtain the second string, the edit operation being of a first type or a second type, the first type edit operation comprising a character insertion operation or character removal operation, the second type edit operation comprising a character maintenance operation; wherein the first type edit operation is associated with an operation score indicative of a cost for applying the edit operation; wherein the first type edit operation is associated with a switching score if it is immediately followed in the sequence by a second type edit operation;
  combining the switching scores and/or the operation scores associated with the sequence of edit operations, resulting in a combined score that is indicative of the similarity level between the first and second strings;
  inputting first $n_1$ characters of the string $s_1$ as the first string and first $n_2$ characters of the string $s_2$ as the second string to the distance algorithm for obtaining the combined score, wherein $0 \leq n_1 \leq N_1$ and $0 \leq n_2 \leq N_2$;
repeatedly inputting the first $n_1$ characters of the string $s_1$ and first $n_2$ characters of the string $s_2$ to the distance algorithm, wherein $n_1$ and $n_2$ are incremented according to a nested loop, where $n_1$ represents the outer loop and $n_2$ represents the inner loop;
wherein the distance algorithm is configured for determining the sequence of edit operations in each iteration by:
  determining whether:
    a first combined score has been previously determined for the first string having $n_1-1$ characters and the second string having $n_2$ characters using a first sequence of the edit operations, and/or
    a second combined score was previously determined for the first string having $n_1$ characters and the second string having $n_2-1$ characters using a second sequence of the edit operations, and/or
    a third combined score was previously determined, using a third sequence of the edit operations, for the first string having $n_1-1$ characters and the second string having $n_2-1$ characters, and the last character of the first string and the second string being the same;
  determining a combined score of the first, second and third combined scores if it is determined that it was not previously determined and selecting the lowest score of the determined combined scores;
  determining an additional operation to be performed in addition to one of the first, second or third sequence of edit operations associated with the selected lowest score in order to obtain the second string from the first string, wherein if the selected pair is $(n_1, n_2-1)$, the additional operation is the insertion operation, and if the selected pair is $(n_1-1, n_2)$ the additional operation is the removal operation and if the selected pair is $(n_1-1, n_2-1)$, the additional operation is the maintenance operation;
  wherein the sequence of edit operations comprises the one of the first, second or third sequence of edit operations associated with the selected lowest score and the determined additional operation;
wherein the distance algorithm is configured in each iteration for combining the switching scores and/or the operation scores associated with the sequence of edit operations by combining the lowest score with the switching score and/or the operation score associated with the additional operation; and
wherein the determining of the distance between the string $s_1$ and string $s_2$ is performed using the obtained combined score of the last iteration; and
  implementing at least one action by the computer system based upon the determined distance.

* * * * *